(12) United States Patent
Yamagata et al.

(10) Patent No.: US 8,733,127 B2
(45) Date of Patent: May 27, 2014

(54) SILICA CONTAINER AND METHOD FOR PRODUCING THE SAME

(75) Inventors: Shigeru Yamagata, Tokyo (JP); Tomomi Usui, Tokyo (JP)

(73) Assignee: Shin-Etsu Quartz Products Co., Ltd., Tokyo (JP)

( * ) Notice: Subject to any disclaimer, the term of this patent is extended or adjusted under 35 U.S.C. 154(b) by 475 days.

(21) Appl. No.: 13/123,629

(22) PCT Filed: Jun. 1, 2010

(86) PCT No.: PCT/JP2010/003651
§ 371 (c)(1), (2), (4) Date: Apr. 11, 2011

(87) PCT Pub. No.: WO2011/007491
PCT Pub. Date: Jan. 20, 2011

(65) Prior Publication Data
US 2011/0192758 A1   Aug. 11, 2011

(30) Foreign Application Priority Data

Jul. 15, 2009   (JP) .................................. 2007-166799

(51) Int. Cl.
C03B 19/09   (2006.01)
(52) U.S. Cl.
CPC ...................................... *C03B 19/09* (2013.01)
USPC ................ 65/17.6; 65/17.3; 65/17.4; 65/17.5
(58) Field of Classification Search
USPC ................................................ 65/17.3–17.6
See application file for complete search history.

(56) References Cited

U.S. PATENT DOCUMENTS

| 4,935,046 A | 6/1990 | Uchikawa et al. |
| 5,145,510 A | 9/1992 | Saito et al. |
| 5,885,071 A | 3/1999 | Watanabe et al. |

(Continued)

FOREIGN PATENT DOCUMENTS

| JP | B2-4-22861 | 4/1992 |
| JP | B2-7-29871 | 4/1995 |

(Continued)

OTHER PUBLICATIONS

Jun. 28, 2013 Taiwanese Office Action issued in Taiwanese Patent Application No. 99118423 (with partial translation).

(Continued)

*Primary Examiner* — Joseph S Del Sole
*Assistant Examiner* — Russell Kemmerle, III
(74) *Attorney, Agent, or Firm* — Oliff PLC

(57) ABSTRACT

A method for producing a silica container, the method including forming a preliminarily molded silica substrate to an intended shape by feeding a powdered substrate's raw material (silica particles) to an inner wall of a carbon-made outer frame having aspiration holes with rotating the outer frame, and forming the silica substrate wherein the preliminarily molded substrate is degassed by aspiration from its outer peripheral side with charging from an inner peripheral side of the preliminarily molded silica substrate a reducing gas containing more than 10% by volume of an $H_2$ gas, and at the same time heated from inside the preliminarily molded silica substrate by a discharge-heat melting method with carbon electrodes, thereby making an outer peripheral part of the preliminarily molded silica substrate to a sintered body while an inner peripheral part of the preliminarily molded silica substrate to a fused glass body.

12 Claims, 6 Drawing Sheets

(56) References Cited

U.S. PATENT DOCUMENTS

| | | | |
|---|---|---|---|
| 5,976,247 A | 11/1999 | Hansen et al. | |
| 6,106,610 A | 8/2000 | Watanabe et al. | |
| 6,546,754 B1* | 4/2003 | Hansen et al. | 65/144 |
| 6,553,787 B1* | 4/2003 | Akiho et al. | 65/17.3 |
| 6,660,671 B2 | 12/2003 | Werdecker et al. | |
| 7,118,789 B2 | 10/2006 | Kemmochi et al. | |
| 8,047,020 B2* | 11/2011 | Fujita et al. | 65/17.3 |
| 8,091,384 B2* | 1/2012 | Sato et al. | 65/17.3 |
| 8,196,429 B2* | 6/2012 | Fujita et al. | 65/17.3 |
| 8,196,430 B2* | 6/2012 | Kishi et al. | 65/17.3 |
| 8,272,234 B2* | 9/2012 | Kemmochi et al. | 65/17.3 |
| 8,460,769 B2* | 6/2013 | Yamagata et al. | 428/34.6 |
| 2002/0166340 A1* | 11/2002 | Kemmochi et al. | 65/17.3 |
| 2002/0166341 A1* | 11/2002 | Shelley et al. | 65/17.3 |
| 2003/0029195 A1* | 2/2003 | Watanabe | 65/17.4 |
| 2008/0289568 A1* | 11/2008 | Kanda et al. | 117/13 |
| 2009/0173276 A1* | 7/2009 | Satou | 117/208 |
| 2010/0107691 A1* | 5/2010 | Sato et al. | 65/17.6 |
| 2010/0319608 A1 | 12/2010 | Kanda | |
| 2011/0123738 A1* | 5/2011 | Kemmochi et al. | 428/34.4 |
| 2011/0256330 A1* | 10/2011 | Yamagata et al. | 428/34.6 |
| 2011/0272322 A1* | 11/2011 | Yamagata et al. | 206/524.6 |
| 2012/0160159 A1* | 6/2012 | Sudo et al. | 117/208 |
| 2013/0128912 A1* | 5/2013 | Molins | 373/27 |

FOREIGN PATENT DOCUMENTS

| | | |
|---|---|---|
| JP | A-7-206451 | 8/1995 |
| JP | A-7-277743 | 10/1995 |
| JP | A-7-277744 | 10/1995 |
| JP | B2-2559604 | 9/1996 |
| JP | A-9-255476 | 9/1997 |
| JP | A-10-25184 | 1/1998 |
| JP | A-11-171684 | 6/1999 |
| JP | A-11-199369 | 7/1999 |
| JP | A-2000-86383 | 3/2000 |
| JP | B2-3046545 | 3/2000 |
| JP | B2-3100836 | 8/2000 |
| JP | A-2002-362932 | 12/2002 |
| JP | A-2004-131380 | 4/2004 |
| JP | A-2004-292211 | 10/2004 |
| JP | A-2008-308383 | 12/2008 |
| WO | WO 2009/041684 A1 | 4/2009 |

OTHER PUBLICATIONS

May 2, 2013 Chinese Office Action issued in Chinese Patent Application No. 2010800030825 (with partial translation).

Feb. 7, 2012 International Preliminary Report on Patentability issued in International Application No. PCT/JP2010/003651.

Dodd et al., "Optical Determinations of OH in Fused Silica," *Journal of Applied Physics*, 1966, p. 3911, vol. 37.

Nasu et al., "Gas release of various kinds of vitreous silica," *Journal of Illuminating Engineering Institute of Japan*, 1990, pp. 595-600, vol. 74.

Khotimchenko et al., "Determining the Content of Hydrogen Dissolved in Quartz Glass Using the Methods of Raman Scattering and Mass Spectrometry," *Journal of Applied Spectroscopy*, 1987, pp. 632-635, vol. 46, No. 6.

Kikuchi et al., "OH Content Dependence of Viscosity of Vitreous Silica," *Journal of the Ceramic Society of Japan*, 1997, pp. 645-649, vol. 105, No, 8.

International Search Report for International Patent Application No. PCT/JP2010/003651, mailed on Jul. 6, 2010.

* cited by examiner

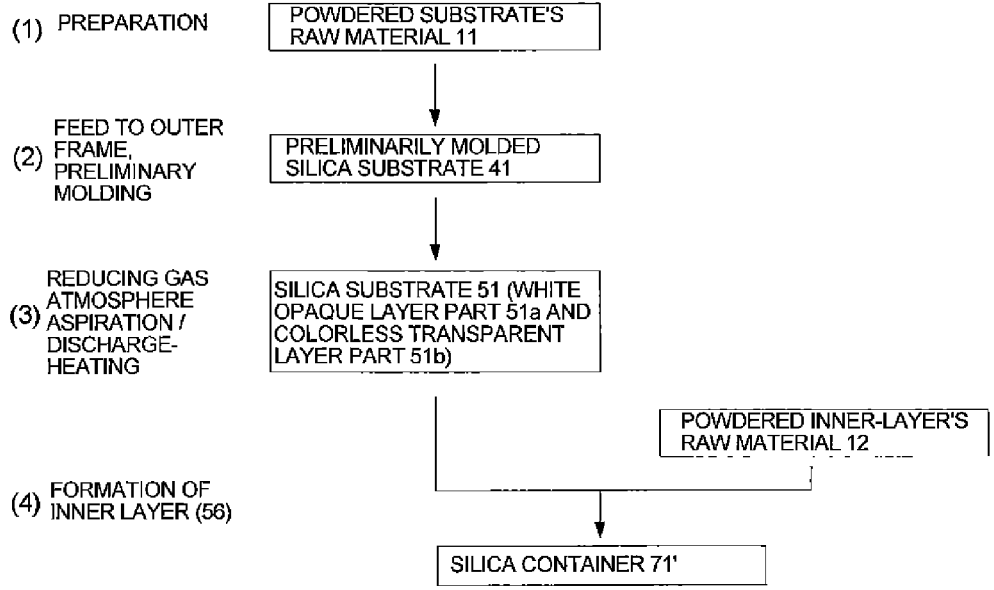
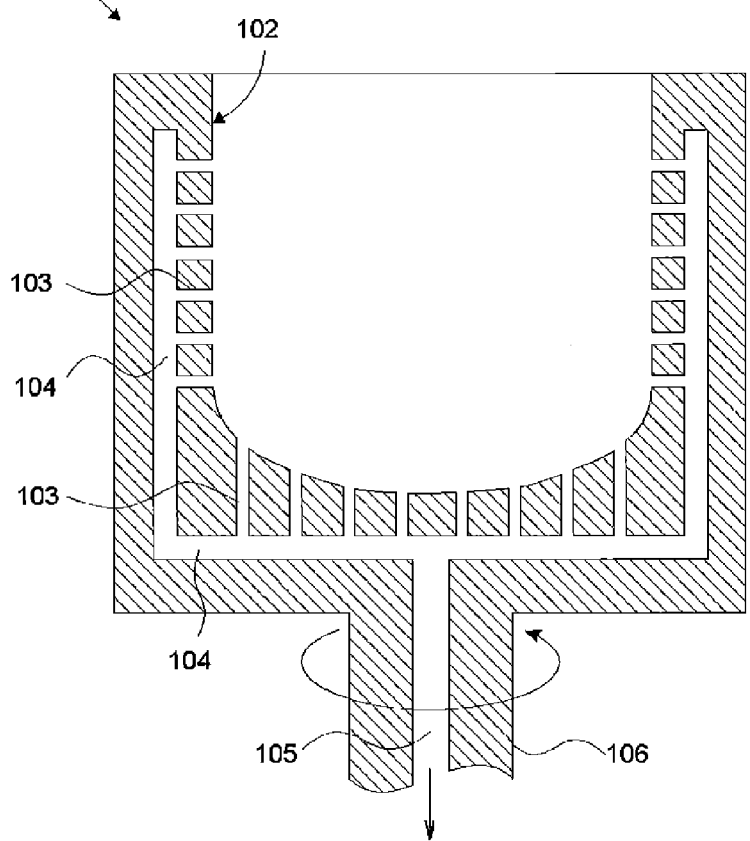

SILICA CONTAINER AND METHOD FOR PRODUCING THE SAME

TECHNICAL FIELD

The present invention relates to a silica container mainly comprised of a silica and to a method for producing it; and in particular, the present invention relates to a silica container with a low cost, a high dimensional precision, and a high thermal distortion resistance, and to a method for producing it.

BACKGROUND ART

A silica glass is used for a lens, a prism and a photomask of a photolithography instrument in manufacturing of a large-scale integrated circuit (LSI), for a TFT substrate used for a display, for a tube of a ultraviolet lamp or an infrared lamp, for a window material, for a reflection plate, for a cleaning container in a semiconductor industry, for a container for melting of a silicon semiconductor, and so forth. However, an expensive compound such as silicon tetrachloride must be used as a raw material for a silica glass; on top of that, melting temperature and processing temperature of a silica glass is extraordinary high (about 2000° C.), thereby leading to a high energy consumption, and this in turn to causing enormous emission of carbon dioxide, which is considered to be one of the global warming gases. Accordingly, from the past, a method for producing a silica glass by using a relatively cheap raw material has been sought.

For example, in Patent Document 1, a method (sol-gel method) in which a silicon alkoxide is hydrolyzed to a silica sol, which is then gelated to a wet gel, then to a dry gel by drying, and finally to a transparent silica glass body by firing at high temperature is disclosed. In Patent Document 2, a method in which a transparent silica glass is obtained by a sol-gel method from a silica sol mixture solution formed of tetramethoxy silane or tetraethoxy silane and a silica sol solution containing silica fine particles is disclosed. In Patent Document 3, a method for producing a transparent silica glass by using a silicon alkoxide and silica glass fine particles as its main raw materials, wherein a heating process at a temperature range of 200 to 1300° C. is carried out under an oxygen gas-containing atmosphere, a further heating process to 1700° C. or higher is carried out under a hydrogen gas-containing atmosphere, and a heating process between the foregoing two heating processes is carried out under a reduced pressure atmosphere, is disclosed. In these conventional sol-gel methods, however, the produced silica glass has problems not only in an initial dimensional precision of the produced silica glass and in a heat resistance during its subsequent use at high temperature but also in its production cost which is not so cheap.

In Patent Document 4, a method (slip casting method), wherein at least two different kinds of silica glass particles, for example, silica glass fine particles and silica glass granules are mixed to obtain a water-containing suspension solution, which is then press molded and sintered at high temperature to obtain a silica-containing composite body, is disclosed. In Patent Document 5, a method, wherein a mixed solution (slurry) containing silica glass particles having the size of 100 μm or less and silica glass granules having the size of 100 μm or more is prepared, then the slurry is cast into a molding frame, dried, and then sintered to obtain an opaque silica glass composite material, is disclosed. In these conventional slip casting methods, however, shrinkage of a molded article in a drying process and a sintering process is so large that a thick silica glass article with a high dimensional precision could not be obtained.

Accordingly, there are problems as mentioned above in the method for producing a silica glass article from a powdered raw material. Therefore, as a method for producing a silica crucible for manufacturing of a single crystal silicon used for LSI, such production methods as those disclosed in Patent Document 6 and Patent Document 7 are being used still today. In these methods, after a powdered ultra-highly purified natural quartz or a powdered synthetic cristobalite is fed into a rotating frame and then molded, carbon electrodes are inserted from the top and then electrically charged to cause arc discharge thereby raising the atmospheric temperature to a temperature range for melting of the powdered quartz (temperature is estimated in the range from about 1800 to about 2100° C.) so that the powdered raw quartz may be melted and sintered.

In these methods, however, there has been a problem of a high cost because powdered raw material quartz with high purity is used. In addition, because various kinds of impure gases are dissolved in a produced silica crucible, the gases are released and then incorporated into a single crystal silicon as gaseous bubbles when it is used as a silica crucible for growing of a single crystal silicon; this and others have been causing problems in production cost as well as quality of the silicon crystal. In addition, there has been a problem about a thermal distortion resistance of the silica crucible because side wall of the crucible is distorted by softening at the time of pulling up of a single crystal silicon.

In Patent Document 8, a silica crucible, obtained from a powdered silica raw material by an arc-discharge melting method and formed of three layers of an outer layer comprised of a natural quartz glass, an intermediate layer comprised of a synthetic quartz glass containing aluminum in high concentration, and an inner layer comprised of a high purity synthetic quartz glass, is described (it seems that the melting was carried out under an air atmosphere). In it, the prevention effect of impurity migration by the intermediate layer is shown. However, not only a high cost of the three-layer structure having the structure as mentioned above but also the problems of thermal distortion resistance have been remained unsolved.

In Patent Document 9, a technology to reduce gaseous bubbles in a wall of a melted quartz crucible by aspiration from a peripheral of a molding frame at the time of an arc-discharge melting of a molded article of a powdered raw material silica is shown.

However, dissolved gases in a wall of a melted quartz crucible could not be removed completely by mere aspiration of an air present in the powdered silica. Particularly, it was only possible to produce a crucible containing a large amount of residual $H_2O$ gas.

In Patent Document 10, a silica crucible, formed of three layers containing a crystallization-facilitating agent and produced by a similar arc-discharge melting method, is shown.

However, when a single crystal silicon is pulled up by using this three-layered crucible, there have been problems that the crucible is not necessarily crystallized uniformly, defects such as voids and pinholes are formed in a grown single crystal silicon because of a large amount of released gases from the crucible, and the thermal distortion takes place at the time of using the crucible.

CITATION LIST

Patent Document

Patent Document 1: Japanese Patent Application Laid-Open Publication No. H07-206451

Patent Document 2: Japanese Patent Application Laid-Open Publication No. H07-277743
Patent Document 3: Japanese Patent Application Laid-Open Publication No. H07-277744
Patent Document 4: Japanese Patent Application Laid-Open Publication No. 2002-362932
Patent Document 5: Japanese Patent Application Laid-Open Publication No. 2004-131380
Patent Document 6: Japanese Examined Patent Application Publication No. H04-22861
Patent Document 7: Japanese Examined Patent Application Publication No. H07-29871
Patent Document 8: Japanese Patent Application Laid-Open Publication No. H09-255476
Patent Document 9: Japanese Patent Application Laid-Open Publication No. H10-25184
Patent Document 10: Japanese Patent Application Laid-Open Publication No. H11-171684

SUMMARY OF THE INVENTION

Technical Problem to be Solved by the Invention

The present invention was made in view of the problems as mentioned above, and has an object to provide a method for producing a silica container, comprised of a silica as the main component therein and having a high dimensional precision and a high thermal distortion resistance, by using powders containing a silica as the main raw material with a low production cost, and an object to provide a silica container such as the one mentioned above.

Solution to Problem

The present invention was made in order to solve the problems as mentioned above and provides a method for producing a silica container, a method for producing a silica container comprised of at least a silica as its main component and arranged with a silica substrate having a rotational symmetry, wherein the method comprises:
a step of preparing a powdered substrate's raw material, comprised of silica particles, for forming the silica substrate,
a step of forming a preliminarily molded silica substrate, wherein the powdered substrate's raw material is fed to an inner wall of a carbon-made outer frame having a rotational symmetry and aspiration holes arranged splittingly in the inner wall while rotating the outer frame thereby preliminarily molding the powdered substrate's raw material to an intended shape in accordance with the inner wall of the outer frame, and
a step of forming the silica substrate, wherein the preliminarily molded silica substrate is degassed by aspiration from an outer peripheral side through the aspiration holes formed in the outer frame with charging from an inner peripheral side of the preliminarily molded silica substrate a reducing gas containing 10% or more by volume of an $H_2$ gas, and at the same time heated from inside the preliminarily molded silica substrate by a discharge-heat melting method with carbon electrodes, thereby making an outer peripheral part of the preliminarily molded silica substrate to a sintered body while an inner peripheral part of the preliminarily molded silica substrate to a fused glass body.

If the method for producing a silica container includes the steps as mentioned above, oxygen-deficient type defects can be contained in the silica substrate by heating in a highly reducing atmosphere. Due to those oxygen-deficient type defects, a high thermal distortion resistance can be afforded to the silica substrate. In addition, the present invention can be executed without adding a special equipment and a process step to a conventional method, so that a silica container having a high thermal distortion resistance can be produced with a high dimensional precision, a high productivity, and a low cost.

In addition, dissolved amount of an $H_2O$ molecule in a produced silica container can be suppressed by heating in the presence of an $H_2$ gas. As a result, release of an $H_2O$ molecule from the silica container can be suppressed at the time when the silica container is used, so that a harmful effect by an $H_2O$ molecule to a material to be accommodated in the silica container can be reduced.

In this case, the powdered substrate's raw material can be made to contain aluminum in the concentration range from 10 to 1000 ppm by weight.

If the powdered substrate's raw material is made to contain aluminum in the concentration range from 10 to 1000 ppm by weight as mentioned above, diffusion of metal impurities in the silica substrate can be suppressed, so that impurity contamination to a material accommodated in the silica container can be reduced.

The method for producing a silica container of the present invention can further include, after the step of forming the silica substrate by the discharge-heat melting method, a step of forming an inner layer comprised of a transparent silica glass on an inner surface of the silica substrate by spreading from inside the silica substrate a powdered inner-layer's raw material comprised of crystalline silica and having a higher silica purity than the powdered substrate's raw material while heating from inside the silica substrate by a discharge-heat melting method.

Accordingly, if any of the foregoing methods for producing a silica container is made to include further a step of forming an inner layer comprised of a transparent silica glass on an inner surface of the obtained silica substrate, impurity contamination to a material accommodated in the produced silica container can be reduced more effectively.

In this case, in the powdered inner-layer's raw material, it is preferable that each element concentration of Li, Na, and K be made 60 or less ppb by weight, and each element concentration of Ti, V, Cr, Fe, Co, Ni, Cu, Zn, Mo, and W be made 30 or less ppb by weight.

If the metals are contained in the powdered inner-layer's raw material with the concentrations as mentioned above, impurity contamination to a material accommodated in the produced silica container can be reduced more effectively.

In addition, in the method for producing a silica container of the present invention, cooling after the discharge-heat melting by the discharge-heat melting method in the step of forming the silica substrate or in the step of forming the inner layer can be carried out under an $O_2$ gas-containing oxidative gas atmosphere.

In this case, it is preferable that the ratio of an $O_2$ gas contained in the oxidative gas be made in the range from 1 to 30% by volume.

In any of the methods for producing a silica container as mentioned above, if cooling after the discharge-heat melting by the discharge-heat melting method in a step of forming the silica substrate or in a step of forming the inner layer is carried out under an $O_2$ gas-containing oxidative gas atmosphere, carbon particles scattered from the carbon electrodes is gasified by oxidation thereby enabling to obtain a silica container having less amount of attached carbon fine particles. In addition, attached carbon fine particles can be removed more effectively by making the ratio of an $O_2$ gas contained in the oxidative gas in the range from 1 to 30% by volume.

In addition, the present invention provides a silica container, a silica container comprised of at least a silica as its main component and arranged with a silica substrate having a rotational symmetry, wherein the silica substrate contains oxygen-deficient type defects and has a white and opaque layer part containing gaseous bubbles in its outer peripheral part and a colorless and transparent layer part comprised of a silica glass not substantially containing gaseous bubbles in its inner peripheral part.

The silica container as mentioned above can be afforded with a high thermal distortion resistance because the container contains oxygen-deficient type defects.

In this case, it is preferable that density of the oxygen-deficient type defects contained in the silica substrate in terms of the light transmittance at the wavelength of 240 nm in the colorless and transparent part be 80% or less per 10-mm of the light path length.

Accordingly, if density of the oxygen-deficient type defects contained in the silica substrate in terms of the light transmittance at the wavelength of 240 nm in the colorless and transparent part is 80% or less per 10-mm of the light path length, the silica container can be made to have a more reliable thermal distortion resistance because density of the oxygen-deficient type defects contained in the silica substrate is adequately high.

In addition, it is preferable that, amount of a released $H_2O$ molecule be $1 \times 10^{17}$ or less molecules/cm$^3$ when the colorless and transparent layer part of the silica substrate is heated at 1000° C. under vacuum.

If the released amount of an $H_2O$ molecule, when the colorless and transparent layer part of the silica substrate is heated at 1000° C. under vacuum, is $1 \times 10^{17}$ or less molecules/cm$^3$, a harmful effect by an $H_2O$ gas molecule to a material accommodated in the silica container can be suppressed.

In addition, it is preferable that concentration of an $H_2$ molecule in the colorless and transparent part of the silica substrate be $5 \times 10^{16}$ or less molecules/cm$^3$.

If concentration of an $H_2$ molecule in the colorless and transparent part of the silica substrate is $5 \times 10^{16}$ or less molecules/cm$^3$ as mentioned above, a harmful effect by an $H_2$ gas molecule to a material accommodated in the silica container can be suppressed.

In addition, it is preferable that viscosity of the colorless and transparent layer part of the silica substrate at 1400° C. be $10^{10.5}$ Pa·s or higher.

If viscosity of the colorless and transparent layer part of the silica substrate at 1400° C. is $10^{10.4}$ Pa·s or higher as mentioned above, the silica container can be made to have a more reliable thermal distortion resistance.

In addition, it is preferable that concentration of an OH group in the silica substrate be 60 or lower ppm by weight.

Further, it is preferable that the silica substrate contain aluminum in the concentration range from 10 to 1000 ppm by weight.

If the silica substrate contains an OH group and aluminum in the concentrations as mentioned above, diffusion of metal impurities in the silica substrate can be suppressed so that impurity contamination to a material accommodated in the silica container can be reduced.

In addition, the silica container of the present invention can be arranged with, on an inner surface of the silica substrate, an inner layer comprised of a transparent silica glass having a higher silica purity than the silica substrate.

If any of the silica containers as mentioned above is arranged with, on an inner surface of the silica substrate, an inner layer comprised of a transparent silica glass having a higher silica purity than the silica substrate, impurity contamination to a material accommodated in the silica container can be reduced more effectively.

In this case, it is preferable that the inner layer contain an OH group with the concentration of 30 or less ppm by weight, an element of Li, Na, and K with each element concentration of 60 or less ppb by weight, and an element of Ti, V, Cr, Fe, Co, Ni, Cu, Zn, Mo, and W with each element concentration of 30 or less ppb by weight.

If concentrations of an OH group and each metal contained in the inner layer are in the values as mentioned above, impurity contamination to a material accommodated in the produced silica container can be reduced more effectively.

Advantageous Effects of the Invention

As described above, according to the method for producing a silica container of the present invention, oxygen-deficient type defects can be contained in the silica substrate. Because of existence of the oxygen-deficient type defects, a high thermal distortion resistance can be afforded to the silica substrate. In addition, a silica container having such a high thermal distortion resistance can be produced with a high dimensional precision, a high productivity, and a low cost.

In addition, a silica container with suppressed amount of dissolved $H_2O$ molecules can be produced. Accordingly, a harmful effect by an $H_2O$ molecule to a material accommodated in the silica container can be reduced because release of $H_2O$ molecules from the silica container during its use can be suppressed.

The silica container according to the present invention can be afforded with a high thermal distortion resistance because the container contains oxygen-deficient type defects.

BRIEF DESCRIPTION OF DRAWINGS

FIG. 4 is a flow chart showing outline of another example of the method for producing a silica container of the present invention.

FIG. 5 is a schematic cross section view showing one example of the outer frame usable in the method for producing a silica container of the present invention.

DESCRIPTION OF EMBODIMENTS

Figure 1:
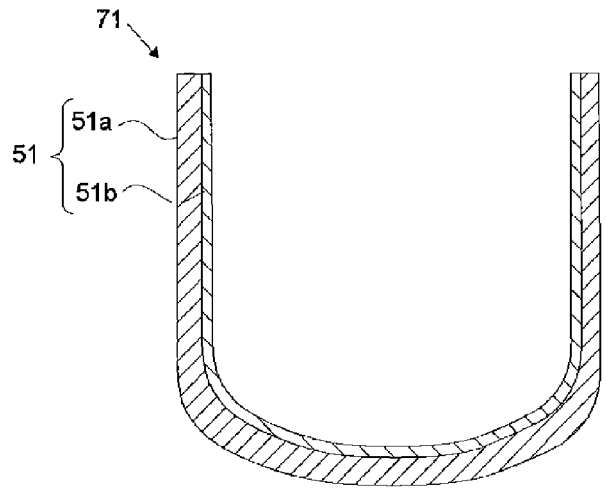
FIG. 1 is a schematic cross section view showing one example of the silica container of the present invention.

As mentioned above, in a conventional method for producing a silica container, there have been problems in heat resistance, dimensional precision, and cost. In particular, there has been a problem of an extremely high cost because a powdered quartz raw material having an ultra-high purity has been used in the entire container.

On top of that, a silica container produced by a conventional method for producing a silica container had a problem such as an effect of gases to a material accommodated therein caused by incorporation of gaseous bubbles into a silicon single crystal in a silica crucible for growing of a silicon single crystal. In particular, a thermal distortion resistance under the use condition of the silica container at high temperature (for example at 1000° C. or higher) has been a serious problem.

The inventors of the present invention carried out investigation in view of the problems as mentioned above and found the following problems to be solved.

Firstly, a silica container such as a crucible and a boat for melting of a metal silicon and for production of a silicon crystal requires thermal uniformity inside the container under atmosphere of high temperature heating. Because of this, the first problem to be solved is to make the silica container at least a multi-layer structure, wherein an outside part of the container is made to a white and opaque porous silica glass while an inside part of the container is made to a colorless and transparent silica glass containing substantially little gaseous bubbles.

As the silicon crystal progresses toward a larger diameter, a large silica container is required, particularly for a silica container such as a crucible and a boat for production of a silicon single crystal; and thus the second problem to be solved is to prevent softening and deformation of the silica container itself at high temperature in melting of a metal silicon (for example about 1400 to about 1600° C.) from occurring, namely to improve a thermal distortion resistance.

The third problem to be solved is to make the silica container contain reduced amounts of dissolved gases (namely, suppressed gas release), such as an $O_2$ gas (an oxygen molecule), an $H_2$ gas (a hydrogen molecule), an $H_2O$ gas (a water molecule), a CO gas (a carbon monoxide molecule), and a $CO_2$ gas (a carbon dioxide molecule).

In the case of the silica container used in pulling up of a silicon single crystal, if gaseous molecules such as an $O_2$ gas, an $H_2$ gas, an $H_2O$ gas, a CO gas, and a $CO_2$ gas are incorporated into the silicon container, these gases are released into a silicon melt at the time when the silicon crystal is produced and are then incorporated into the growing single crystal silicon as gaseous bubbles. The gaseous bubbles incorporated therein form a void and a pinhole when the single crystal silicon is made to a wafer, thereby leading to remarkable decrease in production yield. Accordingly, to suppress release of the gaseous molecules from the silica container was made to the foregoing third problem.

As mentioned above, in the present invention, it was necessary to simultaneously solve these three technical problems with a lower cost as compare with a silica container, such as a crucible for pulling up of a high purity single crystal silicon, produced by a conventional method. Accordingly, the fourth problem to be solved was to obtain a low cost production method by using a cheap silica raw material not requiring a treatment for ultrahigh purification.

Hereinafter, the present invention will be explained in detail with referring to the figures, but the present invention is not limited to them. Particularly in the following, mainly a silica container (a solar-grade crucible) applicable as a container for melting of a metal silicon used as a material for a solar cell (a solar photovoltaic power generation, or a solar power generation) as well as a production method thereof will be mainly explained as one suitable example of application of the present invention; but the present invention is not limited to this and can be applied widely to a general silica container comprised of a silica as the main component and having a rotational symmetry.

In FIG. 1, a schematic cross section view of one example of the silica container of the present invention is shown.

The silica container 71 of the present invention has a rotational symmetry, and its basic structure is comprised of the silica substrate 51. The silica substrate 51 contains oxygen-deficient type defects.

The silica substrate 51 has a white and opaque layer part 51a containing gaseous bubbles in its outer peripheral part and a colorless and transparent layer part 51b comprised of a silica glass not substantially containing gaseous bubbles in its inner peripheral part.

Meanwhile, as far as the silica container of the present invention has at least the silica substrate 51, the silica container may further contain a layer other than the silica substrate.

Figure 2:
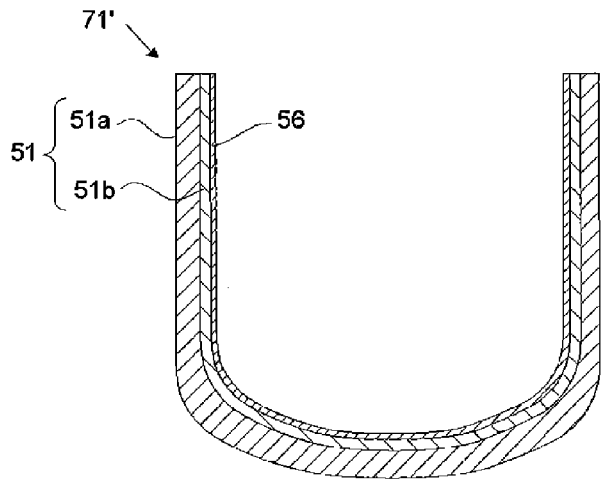
FIG. 2 is a schematic cross section view showing another example of the silica container of the present invention.

In FIG. 2, the silica container 71' arranged with the inner layer 56 comprised of a transparent silica glass on an inner surface of the silica substrate 51 is shown as another example of the silica container of the present invention. It is preferable that a silica purity of the inner layer 56 be higher than that of the silica substrate 51.

Hereinafter, the silica substrate 51 of the present invention will be explained specifically.

Firstly, the silica substrate 51 contains oxygen-deficient type defects as mentioned above.

By making the silica substrate 51 contain the oxygen-deficient type defects, viscosity of the silica glass at high temperature can be increased; and as a result, the thermal distortion resistance of the silica container may be improved.

It is reported that the oxygen-deficient type defects in a silica glass shows an absorption band in the wavelength ranging from about 240 to about 250 nm. For example, a so-called $B_2\alpha$ band is assumed to be an absorption due to a Schottky type defect of an oxygen (O) and shows a maximum absorption at 5.06 eV (246 nm). A so-called $B_2\beta$ band is assumed to be an absorption due to a silicon (Si) lone pair and shows a maximum absorption at 5.14 eV (242 nm). A so-called 5 eV band is assumed to be an absorption due to a silicon cluster in a silica glass and shows a very wide absorption near 5 eV (250 nm).

Absorption band of the silica substrate 51 of the present invention, in particular the absorption band of the colorless and transparent layer part 51b shows a maximum absorption near about 5.17 eV (240 nm wavelength); it is not clear to which kind of the foregoing oxygen-deficient type defects the band belongs. Neither is clear the mechanism for the oxygen-deficient type defects to improve viscosity of the silica glass at high temperature.

Nevertheless, when the silica container 51 is made to contain the oxygen-deficient type defects, a thermal distortion resistance of the silica substrate 51 can be improved.

In this case, it is preferable that density (concentration) of the oxygen-deficient type defects contained in the silica substrate 51 in terms of the light transmittance at the wavelength of 240 nm in the colorless and transparent part 51b be 80% or less, or more preferably in the range from 1 to 60%, per 10-mm of the light path length (here, the light transmittance means a so-called linear transmittance, the transmittance not considering reflection in front and back surfaces of a silica glass and light-scattering inside a silica glass).

Accordingly, if the density is in the range as mentioned above, a thermal distortion resistance of the silica substrate 51 can be improved without fail.

On the other hand, a transparent silica glass not containing the oxygen-deficient type defects and gaseous bubbles shows a light transmittance of about 90% per 10-mm of the light path length at the wavelength of 240 nm.

With higher concentration of the oxygen-deficient type defects in a silica glass, a light transmittance at the wavelength of 240 nm becomes lower. Accordingly, the light transmittance at 240 nm wavelength is preferably as low as possible, but in practical view of an industrial production condition, about 1% is a minimum low value.

The silica substrate 51 has a white and opaque layer part 51$a$ containing gaseous bubbles in its outer peripheral part and a colorless and transparent layer part 51$b$ comprised of a silica glass not substantially containing gaseous bubbles in its inner peripheral part, as mentioned above. Because the silica substrate 51 has the white and opaque layer part 51$a$ and the colorless and transparent layer part 51$b$, as mentioned above, the thermal uniformity inside the silica container under heating condition can be improved.

Bulk density of the white and opaque layer part 51$a$ can be made, for example, in the range from 1.90 to 2.20 g/cm$^3$, and bulk density of the colorless and transparent layer part 51$b$ can be made typically about 2.20 g/cm$^3$; but the present invention is not particularly limited to these values.

The silica containers 71 and 71' are used at high temperature under reduced pressure in many cases so that the amounts of released gases from the silica containers 71 and 71' need to be made small under such conditions. Accordingly, it is preferable that the amount of an H$_2$O molecule released from the colorless and transparent layer part 51$b$ when heated at 1000° C. under vacuum be 1×10$^{17}$ or less molecules/cm$^3$, or more preferably 5×10$^{16}$ or less molecules/cm$^3$. In addition, concentration of an H$_2$ molecule in the colorless and transparent layer part 51$b$ is preferably 5×10$^{16}$ or less molecules/cm$^3$.

Here, as to an H$_2$ gas, when thickness of a silica glass as a measurement sample is thin (for example, one mm or less), release amount of an H$_2$ gas per unit volume under vacuum at 1000° C. is equivalent to concentration of the dissolved H$_2$ molecules per unit volume measured by a Raman scattering measurement method at room temperature.

If the amount of each gas molecules dissolved in the silica substrate 51 is suppressed as mentioned above, a harmful effect by each gas molecule to a material accommodated in the silica container can be reduced. For example, when the silica container 71 of the present invention is used for pulling up of a silicon single crystal, if the foregoing gases are released, the gases are incorporated into the silicon crystal to cause structural defects by gaseous bubbles such as so-called a void and a pinhole in the crystal; but according to the present invention, this harmful effect can be reduced.

In addition, by adding aluminum into the silica substrate 51 preferably in the concentration range from 10 to 1000 ppm by weight, or more preferably in the concentration range from 50 to 500 ppm by weight, adsorption and immobilization of impure metal elements become possible.

When concentration of an OH group in the silica substrate is made preferably 60 or less ppm by weight, or more preferably in the range from 10 to 30 ppm by weight, adsorption and immobilization of impure metal elements can be improved further significantly.

Details of a mechanism for aluminum and an OH group to prevent migration and diffusion of impure metal elements in the silica glass from occurring is not known; but it is assumed that a positive ion (cation) of impure metal elements balances in its electric charge with a silica glass network by displacing Si with Al, resulting in adsorption as well as prevention of diffusion from occurring. On the other hand, it is assumed that the OH group expresses the effect of adsorption of these impure metal elements or prevention of diffusion of the metal elements from occurring by displacement of its hydrogen ion with these metal ions.

An additional effect of adding aluminum into the silica substrate 51 is to increase viscosity of a silica glass at high temperature thereby enabling to improve the thermal distortion resistance of the silica substrate 51 at high temperature; accordingly, the thermal distortion resistance of the silica containers 71 and 71' can be improved.

On the other hand, when concentration of an OH group is made 60 or less ppm by weight, or preferably 30 or less ppm by weight, decrease of the viscosity of a silica glass at high temperature due to the OH group can be suppressed; and thus effects of the foregoing adsorption and immobilization of the impure metal elements can be obtained.

In the present invention, viscosity of the silica substrate 51 can be increased by such methods as forming the oxygen-deficient type defects and adding aluminum; as a result, the thermal distortion resistance of the silica containers 71 and 71' can be improved. Specifically, viscosity of the colorless and transparent layer part 51$b$ of the silica substrate 51 at 1400° C. can be made to 10$^{10.5}$ Pa·s or higher.

Then, the inner layer 56 of the silica container 71' shown in FIG. 2 will be explained.

The inner layer 56 is formed on an inner wall of the silica substrate 51 and formed of a transparent silica glass having a higher silica purity than the silica substrate.

If the inner layer 56 as mentioned above is formed, for example, silica purity of the silica substrate 51 can be made relatively low, in the range from 99.9 to 99.999% by weight. If the silica container 71' arranged with the inner layer 56 is used, impurity contamination to a material accommodated therein can be adequately avoided even if the low-cost silica container having the silica substrate 51 with the silica purity as mentioned above is used.

In addition, it is preferable that the concentration of an OH group contained in the inner layer 56 be 30 or less ppm by weight, or more preferably 10 or less ppm by weight. The OH group contained in the inner layer 56 has an effect to decrease the diffusion rate of impure metal elements, but on the contrary has an effect to decrease an etching resistance; and thus, the concentration is limited in an appropriate range. Further, it is preferable that the inner layer 56 contain each element of Li, Na, and K in the concentration of 60 or less ppb by weight, and each element of Ti, V, Cr, Fe, Co, Ni, Cu, Zn, Mo, and W in the concentration of 30 or less ppb by weight. More preferably, concentration of each element of Li, Na, and K is 20 or less ppb by weight and concentration of each element of Ti, V, Cr, Fe, Co, Ni, Cu, Zn, Mo, and W is 10 or less ppb by weight. With this, a harmful effect by these impure elements to a material to be treated can be reduced. Especially, in the case that a material to be treated is a silicon crystal for solar use, decrease in the incident photon-to-current conversion efficiency can be prevented so that quality of it can be made high.

Hereinafter, a method for producing the silica containers 71 and 71' as mentioned above will be explained specifically. Especially, one example of the method for producing a silica container producible in a low cost (solar grade crucible) and usable as a container for melting of a metal silicon (Si) and pulling up of a single crystal, especially a material for solar photovoltaic power generation device and the like, will be explained.

Figure 3:
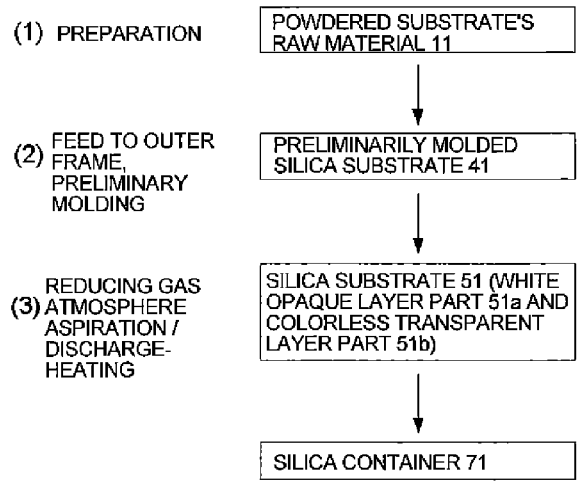
FIG. 3 is a flow chart showing outline of one example of the method for producing a silica container of the present invention.

A schematic diagram of the method for producing the silica container 71 of the present invention is shown in FIG. 3.

Firstly, a powdered substrate's raw material 11 comprised of silica particles is prepared as shown in FIG. 3, (1) (Step 1).

The powdered substrate's raw material 11 will become a main composition material of the silica substrate 51 in the silica containers 71 and 71' of the present invention (refer to FIG. 1 and FIG. 2).

The powdered substrate's raw material can be obtained by crushing mass of silica and granulating the powders thereby obtained, for example, by the method as described below, though not limited to it.

Firstly, mass of natural silica (a naturally produced berg crystal, a quartz, a silica, a silica stone, an opal stone, and the like) with diameter in the range from about 5 to about 50 mm is heated in the temperature ranging from 600 to 1000° C. for about 1 to about 10 hours under an air atmosphere. Then, the mass of natural silica thus treated is poured into water to be cooled down quickly, separated, and then dried. With these treatments, subsequent crushing by a crusher or the like and granulation of the obtained powders can be executed easily; but crushing treatment may be executed without executing the foregoing heating and quick cooling treatments.

Then, mass of the natural silica thus treated is crushed by a crusher or the like, and then granulated to the particle diameter controlled preferably in the range from 10 to 1000 μm, or more preferably in the range from 50 to 500 μm, to obtain a powdered natural silica.

Thereafter, the powdered natural silica thus obtained is heated in the temperature ranging from 700 to 1100° C. for about 1 hour to about 100 hours in a rotary kiln formed of a silica glass tube having an inclination angle, inside of which is made to an atmosphere containing a hydrogen chloride gas (HCl) or a chlorine gas ($Cl_2$) for high-purification treatment. However, for the use not requiring a high purity, this treatment for high purification may be omitted to proceed to the subsequent steps.

The powdered substrate's raw material 11 obtained after the foregoing steps is a crystalline silica; but depending on the use purpose of the silica container, an amorphous silica glass scrap may be alternatively used as the powdered substrate's raw material 11.

Particle diameter of the powdered substrate's raw material 11 is preferably in the range from 10 to 1000 μm, or more preferably in the range from 50 to 500 μm, as mentioned above.

Silica purity of the powdered substrate's raw material 11 is preferably 99.99% or higher by weight, or more preferably 99.999% or higher by weight. According to the method for producing a silica container of the present invention, even if silica purity of the powdered substrate's raw material 11 is made relatively low, such as 99.999% or lower by weight, impurity contamination to a material accommodated in the produced silica container can be adequately avoided. Accordingly, the silica container can be produced with a lower cost as compared with the conventional methods.

In the case that the silica container 71' arranged with the inner layer 56 as shown in FIG. 2 is produced (this method will be described later), especially a silica purity of the powdered substrate's raw material 11 can be made lower; for example, a purity of 99.9% or higher by weight may be allowed.

It is preferable that concentration of an OH group contained in the powdered substrate's raw material 11 be made in the range from about 10 to about 1000 ppm by weight.

The amount of an OH group contained in the powdered substrate's raw material 11 may be as it is contained in the natural silica stone from the beginning; or alternatively the amount of water to be incorporated in the intermediate step can be controlled by gas atmosphere, treatment temperature, and time, in a step of drying followed thereafter. A silica glass synthesized by the flame hydrolysis method or the flame Vernueuil method contains an OH group in the range from 200 to 2000 ppm by weight; and thus concentration of an OH group can also be controlled by adding an appropriate amount of these OH-containing amorphous powdered silicas.

Further, the powdered substrate's raw material 11 may be made to contain aluminum preferably in the range from 10 to 1000 ppm by weight.

Aluminum is added, for example, as an aqueous or an alcoholic solution of an aluminum salt of nitrate, acetate, carbonate, chloride, and the like; and into the solution thus obtained a powdered silica is added and soaked, and then dried.

Then, the powdered substrate's raw material 11 is fed into an outer frame having a rotational symmetry for molding of the powdered substrate's raw material 11, as shown in FIG. 3, (2) (Step 2).

In FIG. 5, a schematic cross section view of the outer frame for preliminary molding of the powdered substrate's raw material 11 is shown. The carbon-made outer frame 101 used in the present invention is comprised of, for example, a carbon material member such as graphite, and has a rotational symmetry. In the inner wall 102 of the carbon-made outer frame 101, the aspiration holes 103 are arranged splittingly. The aspiration holes 103 are connected to the aspiration path 104. The rotation axis 106 to rotate the carbon-made outer frame 101 is also arranged with the aspiration path 105, through which aspiration can be done.

Figure 6:
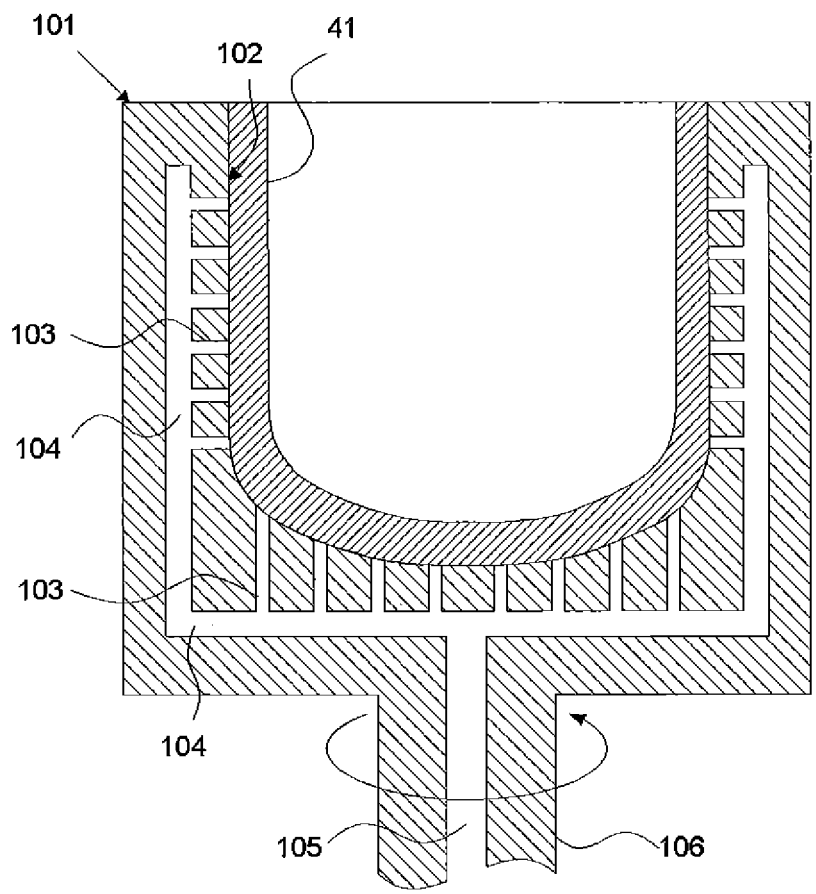
FIG. 6 is a schematic cross section view schematically showing one example of the step of forming the preliminarily molded silica substrate in the method for producing a silica container of the present invention.

The powdered substrate's raw material 11 is fed into the inner wall 102 of the carbon-made outer frame 101 to preliminarily mold the powdered substrate's raw material 11 to a prescribed shape in accordance with the inner wall 102 of the carbon-made outer frame 101 to form the preliminarily molded silica substrate 41 (refer to FIG. 6).

Specifically, the powdered substrate's raw material 11 is fed gradually into the inner wall 102 of the carbon-made outer frame 101 from a hopper of the powdered raw material (not shown) while rotating the carbon-made outer frame 101 thereby molding to a shape of the container by utilizing the centrifugal force. Alternatively, thickness of the preliminarily molded silica substrate 41 may be controlled to the prescribed value by contacting a plate-like inner frame (not shown) to the rotating powders from inside.

A feeding method of the powdered substrate's raw material 11 into the carbon-made outer frame 101 is not particularly limited; for example, a hopper equipped with an agitation screw and with a measuring feeder may be used. In this case, the powdered substrate's raw material 11 filled in the hopper is fed with agitating by the agitation screw while controlling the feeding amount by the measuring feeder.

Then, as shown in FIG. 3, (3), the silica substrate 51 is formed by the discharge-heat melting method under aspiration (Step 3).

Figure 7:
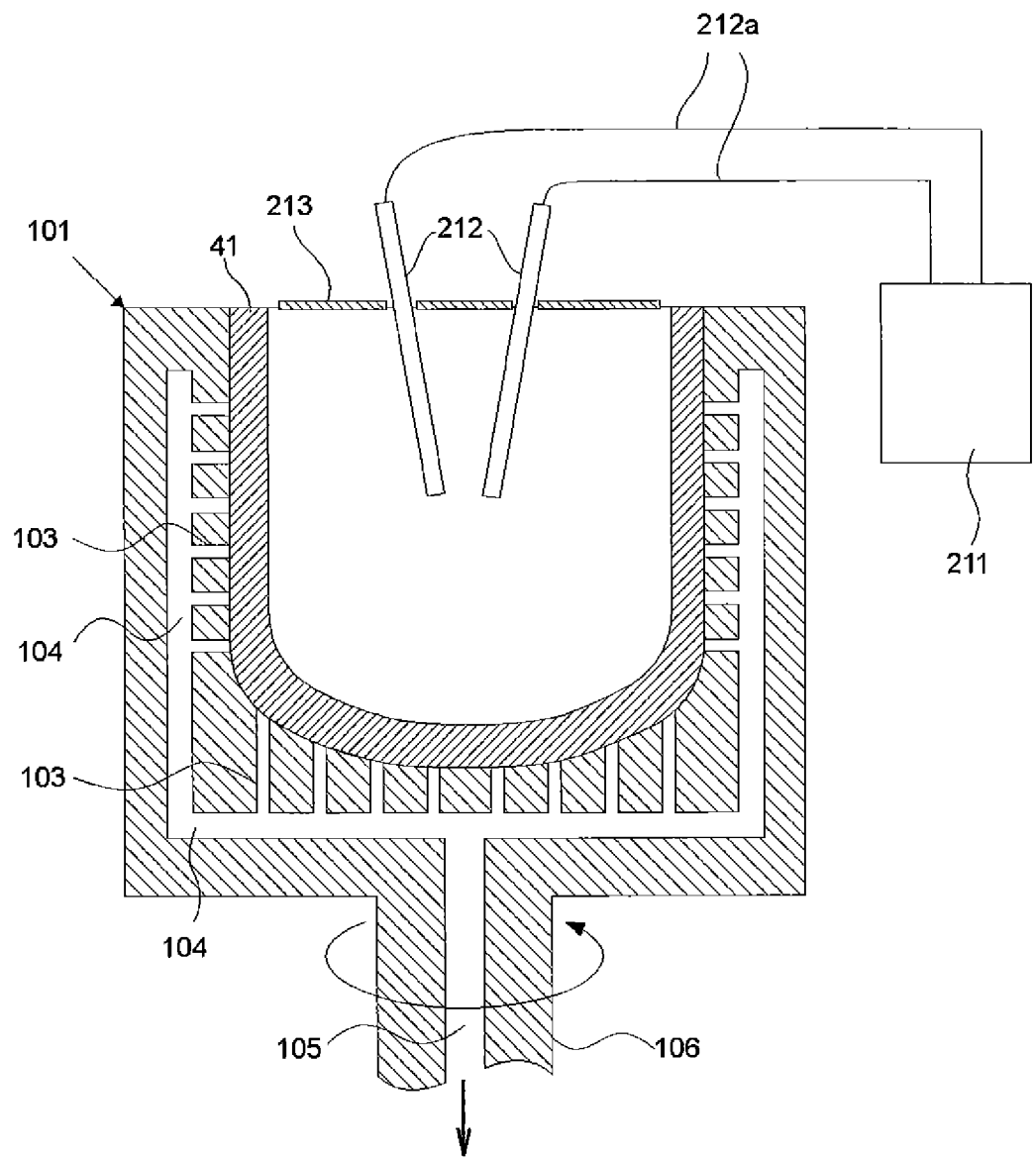
FIG. 7 is a schematic cross section view schematically showing a part of one example of the step of forming the silica substrate (before discharge-heat melting) in the method for producing a silica container of the present invention.
Figure 8:
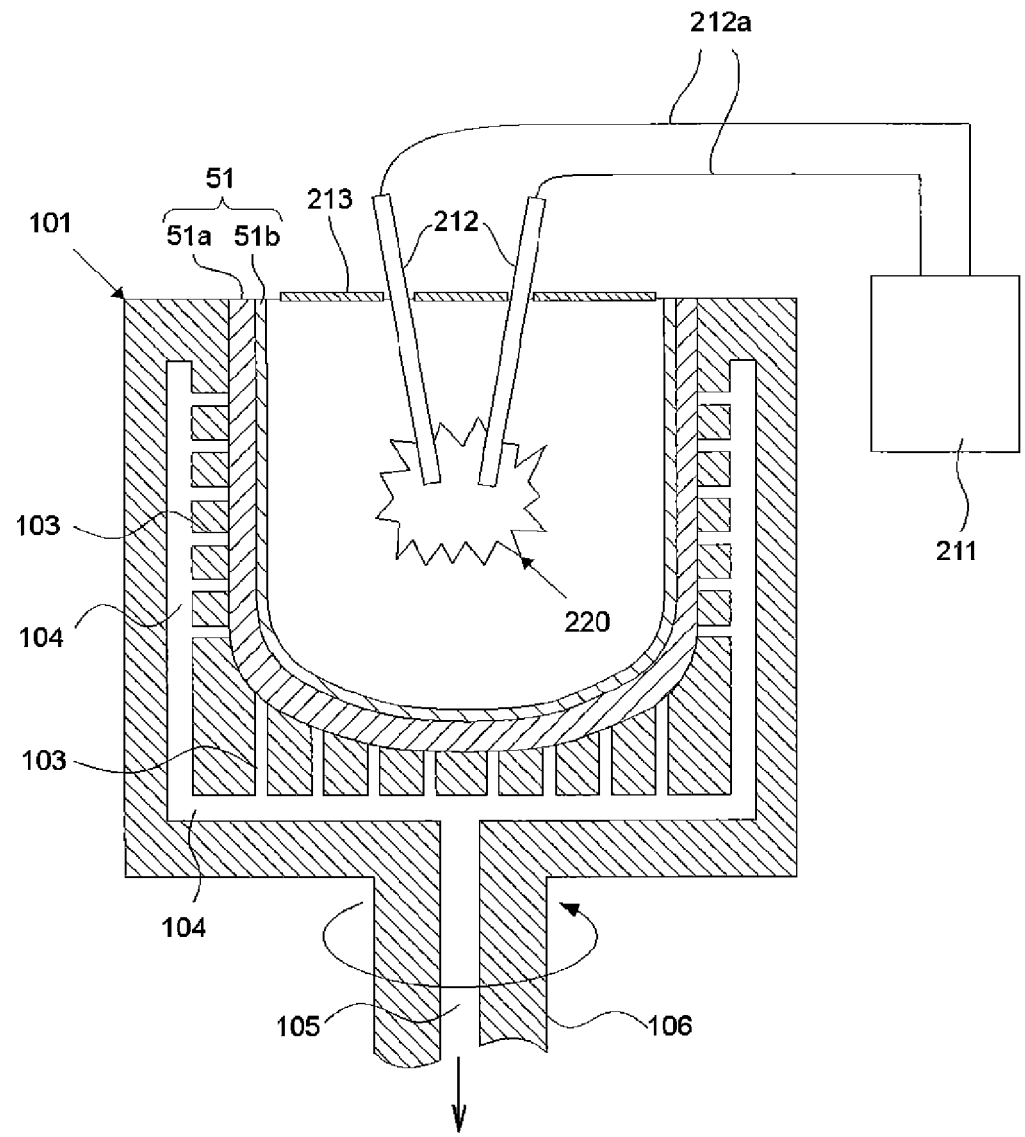
FIG. 8 is a schematic cross section view schematically showing a part of one example of the step of forming the silica substrate (during discharge-heat melting) in the method for producing a silica container of the present invention.

Specifically, as shown in FIG. 7 and FIG. 8, the preliminarily molded silica substrate 41 is degassed by aspiration from the outer peripheral side of the preliminarily molded silica substrate 41 through the aspiration holes 103 formed in the carbon-made outer frame 101, while simultaneously heating from inside of the preliminarily molded silica substrate by the discharge-heat melting method. With this, the silica substrate 51 having a sintered body in the outer peripheral part of the preliminarily molded silica substrate 41 and a fused glass body in the inner part of the preliminarily molded silica substrate 41 is formed.

The equipment for forming the silica substrate 51 is comprised of, in addition to the rotatable carbon-made outer frame 101 having a revolution axis symmetry as mentioned above, a rotation motor (not shown), a gas controller of melting atmosphere (not shown), the carbon electrodes 212 which are the heat source of the discharge-heat melting (sometimes called arc melting or arc discharge melting), the electric wirings 212a, the high voltage electricity source unit 211, and the cap 213.

Meanwhile, if the inner layer 56 is formed on the inner surface of the silica substrate 51, the equipment can also be used successively for it, as will be described later.

Procedures for melting and sintering of the preliminarily molded substrate 41 are as following: firstly, a vacuum pump (not shown) for degassing is started to aspirate the preliminarily molded substrate 41 from its outside through the aspiration holes 103 and the aspiration paths 104 and 105 and at the same time the electric charge to the carbon electrodes 212 is started while the carbon-made outer frame 101 containing the preliminarily molded substrate 41 is rotated at a constant rotation speed.

When the arc discharge between the carbon electrodes 212 is started (shown by the numeral code 220), temperature of the inner surface part of the preliminarily molded silica substrate 41 reaches melting region of the powdered silica (estimated temperature in the range from about 1800 to about 2000° C.) thereby starting to melt from the most surface layer part. When the most surface layer part is melted, degree of vacuum by aspiration with the vacuum pump for degassing increases (pressure is dropped rapidly), the change to a fused silica glass layer progresses from inside to outside while dissolved gases contained in the powdered substrate's raw material 11 are being degassed.

Heating by the electric charge and aspiration by the vacuum pump are continued until about half of inside the entire silica substrate thickness is fused thereby forming the transparent to semitransparent layer part 51b (transparent layer part), while about half of outside remained becomes the sintered white and opaque silica 51a (opaque layer part). Degree of vacuum is preferably $10^3$ Pa or lower.

The atmospheric gas inside the substrate 51 at the time of the discharge-heat melting is mixed with a hydrogen gas ($H_2$) such that the amount of a hydrogen gas may exceed 10% by volume. The atmospheric gas is mainly comprised of, other than a hydrogen, an inert gas such as nitrogen ($N_2$), argon (Ar), and helium (He) in order to make consumption of the carbon electrodes 212 small. With this, a structure of the oxygen-deficient type defects can be formed in the silica substrate 51 after melting, and also amount of the dissolved gases in the silica substrate 51 after melting can be made small. The reason why the amount of dissolved gases in the silica substrate 51 can be made small is assumed that an oxygen gas ($O_2$), which is difficult to be degassed from the silica glass, reacts with hydrogen to form water ($H_2O$), which is easily released outside the substrate because a water molecule has larger diffusion coefficient as compared with an oxygen molecule. In addition, a hydrogen gas ($H_2$) has a larger diffusion coefficient because of a small molecular diameter; and thus it can be easily released outside the substrate even if it is contained in the atmospheric gas. If silica glass is melted in the presence of carbon or graphite and under a hydrogen atmosphere, a strong reducing action is generated so that a structure of the oxygen-deficient type defects can be formed in the silica glass.

The silica container 71 can be made only with the silica substrate 51 formed by the processes up to this stage, but as appropriate, as shown in FIG. 2, the inner layer 56 may be formed on the inner surface of the silica substrate 51, whereby the silica container 71' arranged with the silica substrate 51 and the inner layer 56 can be made.

A method for producing the silica container 71' arranged with the inner layer 56 as shown in FIG. 2 will be explained with referring to FIG. 4.

Firstly, the steps up to form the silica substrate 51 are executed in a similar manner to those of Steps 1 to 3 as shown in the foregoing FIGS. 3, (1) to (3) (refer to FIGS. 4, (1) to (3)).

Then, as shown in FIG. 4, (4), the silica substrate 51 is heated from its inside by the discharge-heat melting method while the powdered inner-layer's raw material 12 comprised of crystalline silica and having a higher silica purity than the powdered substrate's raw material 11 is spread from inside the silica substrate 51, thereby forming the inner layer 56 on the inner surface of the silica substrate 51 (Step 4).

Alternatively, by repeating this. Step 4, the inner layer 56 comprised of a plurality of transparent silica glass layers having different purity and additives may be formed.

A basic method for forming the inner layer 56 is according to, for example, the contents described in Patent Document 6 and Patent Document 7.

Firstly, the powdered inner-layer's raw material 12 is prepared.

The material for the powdered inner-layer's raw material 12 includes a powdered natural quartz, which is purified to ultra high, a powdered natural berg crystal, a powdered synthetic cristobalite, and a powdered synthetic silica glass. A powdered crystalline silica is preferable for the purpose to reduce gaseous bubbles in the inner layer 56, while synthetic powders are preferable for the purpose of forming a transparent layer with a high purity. Particle diameter is in the range from 10 to 1000 μm, or preferably in the range from 100 to 500 μm. Purity is preferably 99.9999% or higher by weight as the silica component ($SiO_2$); while the concentration of each element of Li, Na, and K is 60 or less ppb by weight, or preferably 20 or less by ppb; and the concentration of each element of Ti, V, Cr, Fe, Co, Ni, Cu, Zn, Mo and W is 30 or less ppb by weight, or preferably 10 or less by ppb.

A method for forming the inner layer 56 will be explained with referring to FIG. 9.

The equipment for forming the inner layer 56 on the inner surface of the silica substrate 51 is comprised of, similar to those of the previous step, the rotatable carbon-made outer frame 101 having a revolution axis symmetry and arranged with the silica substrate 51, the rotation motor (not shown), the gas controller of a melting atmosphere (not shown), the powdered raw material's hopper 303 containing the powdered inner-layer's raw material 12 for forming the inner layer 56, the agitating screw 304, the measuring feeder 305, the carbon electrodes 212 which are the heat source of the discharge-heat melting, the electric wirings 212a, the high voltage electricity source unit 211, and the cap 213.

The inner layer 56 is formed as follows; firstly, the carbon-made outer frame 101 is set at the prescribed rotation speed, and then high voltage is loaded gradually from the high voltage electricity source unit 211 and at the same time the powdered inner-layer's raw material 12 for forming the inner layer 56 (high purity powdered silica) is spread gradually from top of the silica substrate 51 from the raw material's hopper 303. At this time, the electric discharge has been started between the carbon electrodes 212 so that inside the silica substrate 51 is in the temperature range of melting of the powdered silica (estimated temperature ranging from about 1800 to about 2000° C.); with this, the spread powdered inner-layer's raw material 12 becomes melted silica particles thereby attaching to the inner surface of the silica substrate 51. A mechanism is employed such that the carbon electrodes 212 arranged in the upper opening site of the silica substrate 51, the feeding port of the powdered raw material, and the cap 213 may change their positions relative to the silica substrate 51 to a certain degree; and by changing these positions, the inner layer 56 can be formed on the entire inner surface of the silica substrate 51 with a uniform thickness.

The atmospheric gas inside the silica substrate 51 at the time of the discharge-heat melting to form the inner layer 56 is an inert gas such as a $N_2$ gas, an Ar gas, and a He gas as its main component in order to make consumption of the carbon electrodes small, while the inner layer 56 containing less amount of gaseous bubbles can be obtained by making the gas atmosphere mixed with an $H_2$ gas in the range from 1 to 30% by volume. When the amount of an $H_2$ gas in the gas mixture is 1% or more by volume, reducing effect of the gaseous bubbles contained in the inner layer 56 (transparent silica glass) can be made more prominent; on the other hand, when the amount of an $H_2$ gas in the gas mixture is 30% or less by volume, a sufficient reducing effect of the gaseous bubbles contained in the inner layer 56 can be obtained and the cost of the gas mixture can be suppressed; and thus such method is desirable also from an industrial view point. In this case, amount of dissolved $H_2O$ molecules can be effectively reduced by making the atmospheric gas dry without containing moisture.

Further, when the atmosphere is made to a gas mixture with an oxygen gas ($O_2$) in the concentration range from 1 to 30% by volume, fine particles of carbon (C) generated upon the discharge-heat melting is oxidized to CO and $CO_2$, thereby enabling to obtain the inner layer 56 containing less amount of fine particles of carbon (C). When the amount of $O_2$ in the gas mixture is 1% or more by volume, reducing effect of carbon fine particles contained in the inner layer 56 (transparent silica glass) can be made even larger; when the amount of $O_2$ in the gas mixture is 30% or less by volume, sufficient reducing effect of carbon fine particles contained in the inner layer 56 can be obtained and at the same time consumption of the carbon electrodes can be lowered; and thus such method is desirable also from an industrial view point. In this case, CO and $CO_2$ are generated as mentioned above, but they can be removed because of aspiration.

If carbon fine particles generated by the discharge-heat melting, and carbon monoxide (CO) and carbon dioxide ($CO_2$), which are the compounds between carbon and oxygen, are remained in the inner layer 56, they are regenerated as the impurities at the time of pulling up of a silicon single crystal, thereby becoming one cause of decreasing quality of the silicon. In order to suppress this effect further, it is preferable that inside the silica container be appropriately ventilated during melting with introducing an atmospheric gas at a certain constant rate and exhausting it at a certain constant rate.

Further, if necessary in the present invention, cooling after the discharge-heat melting by the discharge-heat melting method in a step of forming the silica substrate 51 (Step 3 shown in FIG. 3 and FIG. 4) or in a step of forming the inner layer 56 (Step 4 shown in FIG. 4) can be executed under an $O_2$ gas-containing oxidative gas atmosphere. At this time, if the atmospheric gas in the discharge-heat melting is an $H_2$ gas-containing $N_2$ gas and the like as mentioned above, the atmospheric gas needs to be displaced with an $O_2$ gas-containing oxidative gas.

If the atmospheric gas in the cooling process is made to an $O_2$ gas-oxidative gas, carbon particles generated from the carbon electrode, which are attached to the silica substrate 51 and the inner layer 56, or remained in the nearby atmosphere, can be gasified by the oxidation treatment; and thus a silica container having reduced amount of attached carbon fine particles can be obtained. Meanwhile, the $O_2$ gas ratio contained in the oxidative gas in the cooling process is made preferably in the range from 1 to 30% by volume.

Meanwhile, when the silica container 71' arranged with the formed inner layer 56 as shown in FIG. 2 and FIG. 4 is produced, the cooling of the silica substrate 51 to room temperature under an $O_2$-containing oxidative atmosphere can be done, if the cooling is done once the formed silica substrate 51, during this cooling process; or if the silica substrate 51 is formed followed by formation of the inner layer 56 with keeping high temperature followed by cooling, the cooling is executed during this cooling process. As a matter of course, the cooling may be executed in the both processes.

In the way as described above, the silica containers 71 and 71' of the present invention can be obtained; the silica containers are cleaned as following when it is necessary.

[Cleaning and Drying of the Silica Container]

For example, a silica container is etched on its surface by an aqueous solution of hydrogen fluoride (HF) in the concentration range from about 1 to about 10% with the time for 5 to 30 minutes, washed by pure water, and then dried in a clean air.

By executing the foregoing steps, the silica container 71 and 71' of the present invention as mentioned above and as shown in FIG. 1 and FIG. 2 can be produced.

EXAMPLE

Hereinafter, the present invention will be explained more specifically by showing Examples and Comparative Examples of the present invention; but the present invention is not limited to them.

Example 1

According to the method for producing a silica container of the present invention as shown in FIG. 3, the silica container was produced as following.

Firstly, as shown in FIG. 3, (1), the powdered substrate's raw material 11 was prepared as following (Step 1).

Natural silica stones (100 kg) were prepared, heated in an air atmosphere at 1000° C. for 10 hours, poured into a pool of pure water whereby the stone was cooled quickly. After drying, the stone was crushed by a crusher to make total weight 90 kg of the powdered silica (the powdered natural silica stone) having particle diameter in the range from 50 to 500 μm and silica purity ($SiO_2$) of 99.999% or higher by weight.

Then, as shown in FIG. 3, (2) and FIG. 6, the powdered substrate's raw material 11 was fed to the inner wall 102 of the rotating carbon-made outer frame 101 (graphite-made) with a column-like shape having the aspiration holes 103 formed in the inner wall 102; and a shape of the powdered substrate's raw material 11 was adjusted so as to obtain uniform thickness in accordance with the shape of the carbon-made outer frame 101; in this way, the preliminarily molded silica substrate 41 was formed (Step 2).

Then, as shown in FIG. 3, (3), FIG. 7, and FIG. 8, the silica substrate 51 was formed by the discharge-heat melting method under aspiration (Step 3).

Specifically, the preliminarily molded silica substrate 41 was aspirated for degassing from the outer peripheral side of the preliminarily molded silica substrate 41 through the aspiration holes 103 formed in the carbon-made outer frame 101 with charging a gas mixture comprised of 80% by volume of dried $N_2$ (nitrogen) and 20% by volume of $H_2$ (hydrogen) from the inner peripheral side of the preliminarily molded silica substrate 41, and at the same time the preliminarily molded silica substrate 41 was heated from the inside thereof at high temperature by the discharge-heat melting method with the carbon electrodes 212; with this, the outer peripheral part of the preliminarily molded silica substrate 41 was made to a sintered body and the inner part of the preliminarily molded silica substrate 41 was made to a fused glass body, thereby forming the silica substrate 51, which was made to the silica container 71.

Thereafter, the silica substrate 51 (silica container 71) was cooled to room temperature under a mixed gas atmosphere comprised of 80% by volume of $N_2$ (nitrogen) and 20% by volume of $O_2$ (oxygen).

The silica container 71 thus obtained was washed with 3% by weight of an aqueous solution of hydrogen fluoride (HF) for 3 minutes, rinsed with pure water, and then dried.

Example 2

Basically the same procedures as Example 1 were carried out to produce the silica container 71, except that the atmospheric gas at the time when the preliminarily molded silica substrate 41 was melted in Step 3 was made to a gas mixture comprised of 60% by volume of dried $N_2$ (nitrogen) and 40% by volume of $H_2$ (hydrogen).

Example 3

According to the method for producing a silica container of the present invention as shown in FIG. 4, the silica container 71' was produced as following.

Step 1 shown in FIG. 4, (1) was carried out in a similar manner to those of Example 1 except that aluminum was added to the powdered substrate's raw material 11 such that concentration of aluminum in it might become 20 ppm by weight.

Then, steps in FIGS. 4, (2) and (3) (Steps 2 to 3) were carried out in a similar manner to those of Example 1 except that cooling of the silica substrate 51 once was skipped to proceed to the next step (Step 4).

Figure 9:
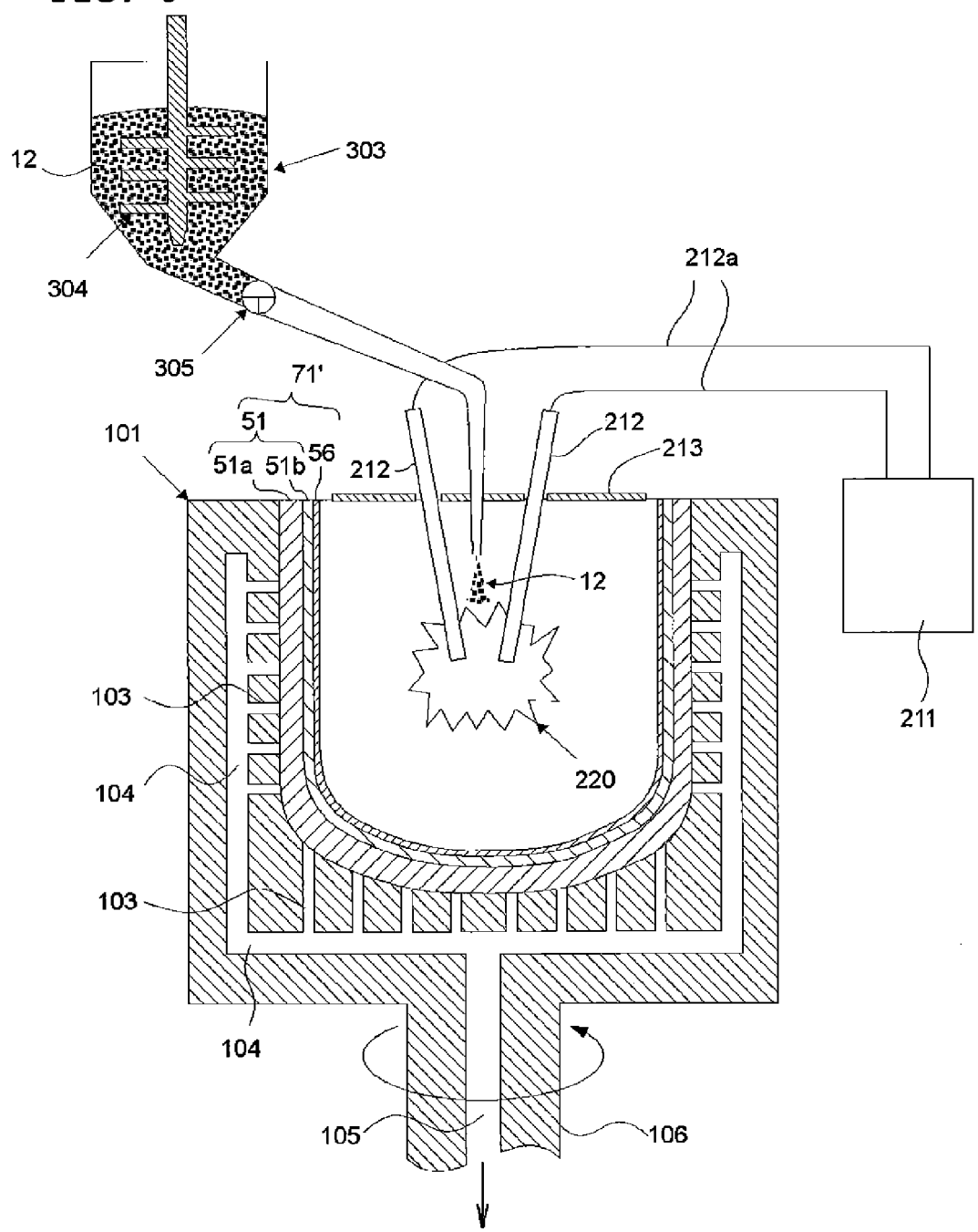
FIG. 9 is a schematic cross section view schematically showing one example of the step of forming the inner layer in the method for producing a silica container of the present invention.

Then, as shown in FIG. 4, (4) and FIG. 9, a high purity powdered synthetic cristobalite (particle diameter in the range from 100 to 300 μm, and silica purity of 99.99999% or higher by weight) was prepared as the powdered inner-layer's raw material 12. Then, the powdered inner-layer's raw material 12 was spread from inside the silica substrate 51 under atmosphere of the gas mixture comprised of 95% by volume of $N_2$ (nitrogen) and 5% by volume of $H_2$ (hydrogen) while heating from inside thereof by the discharge-heat melting method thereby forming the inner layer 56 comprised of a transparent silica glass on the inner surface of the silica substrate 51; with this, the silica container 71' was made. Thereafter, the silica container 71' was cooled to room temperature under atmosphere of the gas mixture comprised of 80% by volume of $N_2$ (nitrogen) and 20% by volume of $O_2$ (oxygen) (Step 4).

Similar to Example 1, the silica container 71' thus obtained was washed with 3% by weight of an aqueous solution of hydrogen fluoride (HF) for 3 minutes, rinsed with pure water, and then dried.

Example 4

Basically the same procedures as Example 3 were carried out to produce the silica container 71', except that the atmospheric gas at the time when the preliminarily molded silica substrate 41 was melted in Step 3 was made to a gas mixture comprised of 60% by volume of dried $N_2$ (nitrogen) and 40% by volume of $H_2$ (hydrogen).

Example 5

Basically the same procedures as Example 3 were carried out to produce the silica container 71', except for the following changes.

In Step 1, aluminum was added such that aluminum might be contained in the powdered substrate's raw material 11 with the concentration of 30 ppm by weight.

In Step 3, the atmospheric gas when the preliminarily molded silica substrate 41 was melted was made to a gas mixture comprised of 40% by volume of dried $N_2$ (nitrogen) and 60% by volume of $H_2$ (hydrogen).

In Step 4, the discharge-heating to form the inner layer 56 was carried out in a mixed gas atmosphere comprised of 90% by volume of $N_2$ (nitrogen) and 10% by volume of $H_2$ (hydrogen).

Example 6

Basically the same procedures as Example 5 were carried out, except that the atmospheric gas at the time when the preliminarily molded silica substrate 41 was melted in Step 3 was made to a gas mixture comprised of 20% by volume of dried $N_2$ (nitrogen) and 80% by volume of $H_2$ (hydrogen).

Example 7

Basically the same procedures as Example 1 were carried out to produce the silica container 71 comprised of the silica substrate 51, except that the atmospheric gas at the time when the preliminarily molded silica substrate 41 was melted in Step 3 was made to a gas mixture comprised of 85% by volume of dried $N_2$ (nitrogen) and 15% by volume of $H_2$ (hydrogen).

Example 8

Basically the same procedures as Example 3 were carried out to produce the silica container 71' comprised of the silica substrate 51 and the inner layer 56, except that the atmospheric gas at the time when the preliminarily molded silica substrate 41 was melted in Step 3 was made to a gas mixture comprised of 85% by volume of dried $N_2$ (nitrogen) and 15% by volume of $H_2$ (hydrogen).

Comparative Example 1

According to mostly a conventional method, a silica container (a silica crucible) was prepared. Namely, a part corresponding to the silica substrate of the silica container of the present invention was formed by also using a high purity powdered raw material with the discharge-heat melting method.

Firstly, a high purity powdered natural quartz having silica purity of 99.9999% or higher by weight (particle diameter in the range from 100 to 300 μm) was prepared as the powdered raw material corresponding to the powdered substrate's raw material.

By using this powdered raw material under an air atmosphere without specific humidity control, this high purity powdered natural quartz was fed to a rotating carbon-made (graphite-made) frame by utilizing a centrifugal force to form a powdered quartz layer in the rotating frame; the layer was then melted by discharge-heating with the carbon electrodes to form the silica substrate (corresponding to the silica substrate 51 of the present invention shown in FIG. 2). Time of this procedure was 60 minutes, and temperature of the silica substrate was estimated to be about 2000° C.

Then, the same powdered synthetic cristobalite as in Examples 3 to 8 was prepared as the powdered raw material corresponding to the powdered inner-layer's raw material; then this high purity powdered synthetic cristobalite was spread from the hopper onto an inner surface of the silica substrate and was melted by the discharge-heating method with the carbon electrodes under an air atmosphere without specific humidity control to form the inner layer (corresponding to the inner layer 56 in the silica container 71' of the present invention, as shown in FIG. 2).

Comparative Example 2

Basically the same procedures as Comparative Example 1 were carried, except that melting of the silica substrate (corresponding to the silica substrate 51 of the present invention, as shown in FIG. 2) was executed in the alumina-made frame by the discharge-heat melting method under an aspirated air atmosphere without specific humidity control.

Comparative Example 3

Basically the same procedures as Example 1 were carried out to produce the silica container 71 comprised of the silica substrate 51, except that the atmospheric gas at the time when the preliminarily molded silica substrate 41 was melted in Step 3 was made to a gas mixture comprised of 90% by volume of dried $N_2$ (nitrogen) and 10% by volume of $H_2$ (hydrogen).

Comparative Example 4

Basically the same procedures as Example 3 were carried out to produce the silica container 71' comprised of the silica substrate 51 and the inner layer 56, except that the atmospheric gas at the time when the preliminarily molded silica substrate 41 was melted in Step 3 was made to a gas mixture comprised of 90% by volume of dried $N_2$ (nitrogen) and 10% by volume of $H_2$ (hydrogen).

[Evaluation Methods in Examples and Comparative Examples]

Measurements of physical properties and property evaluation of the silica container produced in each Example and Comparative Example were carried out as shown below.

Analysis of the Impure Metal Element Concentration

When the impure metal element concentration is relatively low (i.e., the glass is of high purity), ICP-AES (Inductively Coupled Plasma-Atomic Emission Spectroscopy) or ICP-MS (Inductively Coupled Plasma-Mass Spectroscopy) was used, and when the impure metal element concentration is relatively high (i.e., the glass is of low purity), AAS (Atomic Absorption Spectroscopy) was used.

Method for Measuring Particle Diameter of Each Powdered Raw Material

Two-dimensional shape observation and area measurement of each powdered raw material were carried out with an optical microscope or an electron microscope. Then the diameter was obtained by calculation of the obtained area value with the assumption that shape of the particle is a true circle. This technique was repeated statistically to obtain the range of particle diameter (99% or more by weight of particles are included in this range).

Measurement of Transmittance

A sample with the size of 6×6 mm (10-mm thickness) having optically polished parallel edges was prepared from the inner part of the silica substrate not containing gaseous bubbles (colorless and transparent layer part) of each of the silica containers in Examples and Comparative Examples; the linear light transmittance of this sample was measured at the wavelength of 240 nm by using a UV spectrophotometer. Accordingly, the front-side reflection loss of incident light into the sample and the back-side reflection loss of outgoing light are not considered in the light transmittance value, which is expressed by the following equation.

Light Transmittance (%)=100×(strength of outgoing light)/(strength of incident light)

Meanwhile, in Comparative Example 1, a part containing sufficiently low amount of gaseous bubbles to prepare the sample for measurement of the transmittance did not exist in good size; thus the transmittance could not be measured.

Thickness Measurement of Each Layer

The container cross section at the half part of total height of side wall of the silica container was measured by a scale to obtain thickness of the silica substrate and the inner layer.

Measurement of Concentration of an OH Group

The measurement was done with an infrared absorption spectroscopy. Conversion to concentration of an OH group was done according to the following literature:

Dodd, D. M. and Fraser, D. B., (1966), "Optical determination of OH in fused silica", Journal of Applied Physics, vol. 37, p. 3911.

Method for Measurement of Amount of Gas Molecules Released from Each of the Silica Substrates and the Inner Layers Each measurement sample with the size of 10×50 mm (1-mm thickness), both surfaces of which were mirror-polished, was prepared from the inner part of the silica substrate not containing gaseous bubbles (a colorless and transparent layer part, or in the case of Comparative Examples 1 an inner-most part having relatively small amount of gaseous bubbles) and from the inner layer of each of the silica containers in Examples and Comparative Examples; then the sample thus obtained was placed in a vacuum chamber; amount and kind of the respective released gases at 1000° C. under vacuum were then measured with a mass analyzer.

It was assumed that all of an $H_2$ gas and an $H_2O$ gas were released; and the amount of each gas was expressed by the number of released molecules per unit volume (molecules/$cm^3$). Details of the measurement were followed in accordance with the following literature:

Nasu, S., et al., (1990), "Gas release of various kinds of vitreous silica", Journal of Illuminating Engineering Institute of Japan, vol. 74, No. 9, pp 595 to 600.

As to the $H_2$ gas, it was confirmed that the same value could also be obtained as the dissolved concentration in the silica glass by the measurement method in the following literature.

Khotimchenko, V. S., et al., (1987), "Determining the content of hydrogen dissolved in quartz glass using the methods of Raman scattering and mass spectrometry", Journal of Applied Spectroscopy, Vol. 46, No. 6, pp 632-635.

Viscosity

A material with the size of about 10×10 cm was cut out from each silica container, rinsed, and then kept in an electric furnace under an air atmosphere at 1150° C. for 3 hours. Then, the temperature was descended to 900° C. at the descendent rate of 10° C./hour; thereafter, the electric switch was turned off to allow the temperature be descended down to room temperature naturally in the electric furnace. With this heat treatment, the materials cut out from respective silica containers were made equal in their thermal histories. Then, each measurement sample having the size of 3×10 mm (100-mm length) and mirror-polished on the entire surface was prepared from the inside part of the silica substrate not having gaseous bubbles in the material (a colorless and transparent layer part, or in the case of Comparative Examples 1 an inner-most part having relatively small amount of gaseous bubbles). Then, viscosity η at 1400° C. was measured by a beam bending method. Details were followed in the literature shown below.

Yoshikazu Kikuchi, et al., (1997), "OH Content Dependence of Viscosity of Vitreous Silica", Journal of the Ceramics Society of Japan, Vol. 105, No. 8, pp. 645-649.

Evaluation of Continuous Pulling Up of a Single Crystal Silicon (Multipulling)

A metal polysilicon with purity of 99.99999% by weight was fed into a produced silica container; thereafter, the temperature was raised to form a silicon melt, and then pulling up of a single crystal silicon was repeated for three times (multipulling). The evaluation was made as the success rate of single crystal growth. The pulling up conditions were: atmosphere of 100% of an argon gas (Ar) with the pressure inside the CZ equipment being $10^3$ Pa, 1 mm/minute of the pulling up rate, rotation numbers of 10 rpm, and size of the single crystal silicon with 150 mm in diameter and 150 mm in length. Operation time for one batch was set at about 12 hours. Classification of evaluation based on the success rate of single crystal growth for repetition of three times was made as following:

three times: good
two times: fair
one time: poor

Evaluation of the Thermal Distortion Resistance of a Silica Container

In evaluation of the multipulling of a single crystal silicon as mentioned above, amount of collapse of the side wall upper part of a silica container toward inside thereof after the third pulling up was evaluated as following:

amount of collapse toward inside was less than 1 cm: good
amount of collapse toward inside was 1 cm or more and less than 2 cm: fair
amount of collapse toward inside was 2 cm or more: poor Evaluation of Voids and Pinholes In the foregoing multipulling of the single crystal silicon, 10 sheets of silicon wafer, both sides of which were polished, having the size of 150 mm diameter and 200 μm thickness were prepared from an arbitrary portion of the first single crystal silicon after multipulling of each single crystal silicon. Then, voids and pinholes present on the both sides of each silicon wafer were counted; average void numbers and pinhole numbers per unit area ($m^2$) were obtained by a statistic numerical treatment.

average number of voids and pinhole is less than $1/m^2$ good
average number of voids and pinhole is in the range from 1 to $2/m^2$ fair
average number of voids and pinhole is more than $3/m^2$ poor Production conditions, measured physical properties, and evaluation results of each silica container produced in Examples 1 to 8 and Comparative Examples 1 to 4 are summarized in the following Tables 1 to 6 and Table 7. Analysis data of impurity in the inner layer are shown in Table 7.

TABLE 1

| Example No. | | Example 1 | Example 2 |
|---|---|---|---|
| Powdered substrate's raw material | | Powdered natural silica Particle diameter: 50 to 500 μm | Powdered natural silica Particle diameter: 50 to 500 μm |
| Powdered inner-layer's raw material | | No | No |
| Preliminary molding method of silica substrate | | Rotation molding within graphite frame | Rotation molding within graphite frame |
| Melting method of silica substrate | | Arc discharge melting under aspiration | Arc discharge melting under aspiration |
| Atmospheric gas during silica substrate melting | | $N_2$: 80% by volume, $H_2$: 20% by volume | $N_2$: 60% by volume, $H_2$: 40% by volume |
| Atmospheric gas during inner layer melting | | — | — |
| Atmospheric gas during cooling | | $N_2$: 80% by volume, $O_2$: 20% by volume | $N_2$: 80% by volume, $O_2$: 20% by volume |
| Physical properties of silica substrate | Color tone | White opaque to colorless transparent | White opaque to colorless transparent |
| | Diameter, height, thickness (mm) | Diameter 300/height 300/thickness 12 | Diameter 300/height 300/thickness 12 |
| | Light transmittance of colorless and transparent layer at 240 nm (%, 10-mm thickness) | 58 | 40 |
| | OH Concentration (ppm by weight) | 10 | 2 |
| | $H_2$ Concentration (molecules/$cm^3$) | $2 \times 10^{16}$ | $4 \times 10^{16}$ |
| | Amount of $H_2O$ release (molecules/$cm^3$) | $7 \times 10^{16}$ | $<5 \times 10^{16}$ |
| | Al Concentration (ppm by weight) | 2 | 2 |
| | $\log(\eta/Pa \cdot s)$ of colorless and transparent layer at 1400° C. (η: viscosity(Pa · s)) | 10.5 | 10.6 |

TABLE 1-continued

|  |  | Example 1 | Example 2 |
|---|---|---|---|
| Physical properties of inner layer | Color tone | — | — |
|  | Thickness (mm) | — | — |
|  | OH Concentration (ppm by weight) | — | — |
|  | $H_2$ Concentration (molecules/cm$^3$) | — | — |
|  | Amount of $H_2O$ release (molecules/cm$^3$) | — | — |
| Evaluation | Silicon single crystal mutipulling | Fair | Fair |
|  | Thermal distortion resistance | Fair | Fair |
|  | Void and pinhole of silicon single crystal | Fair | Good |

TABLE 2

|  |  | Example 3 | Example 4 |
|---|---|---|---|
| Powdered substrate's raw material | | Powdered natural silica Particle diameter: 50 to 500 μm | Powdered natural silica Particle diameter: 50 to 500 μm |
| Powdered inner-layer's raw material | | Powdered synthetic cristobalite Particle diameter: 100 to 300 μm | Powdered synthetic cristobalite Particle diameter: 100 to 300 μm |
| Preliminary molding method of silica substrate | | Rotation molding within graphite frame | Rotation molding within graphite frame |
| Melting method of silica substrate | | Arc discharge melting under aspiration | Arc discharge melting under aspiration |
| Atmospheric gas during silica substrate melting | | $N_2$: 80% by volume, $H_2$: 20% by volume | $N_2$: 60% by volume, $H_2$: 40% by volume |
| Atmospheric gas during inner layer melting | | $N_2$: 95% by volume, $H_2$: 5% by volume | $N_2$: 95% by volume, $H_2$: 5% by volume |
| Atmospheric gas during cooling | | $N_2$: 80% by volume, $O_2$: 20% by volume | $N_2$: 30% by volume, $O_2$: 20% by volume |
| Physical properties of silica substrate | Color tone | White opaque to colorless transparent | White opaque to colorless transparent |
|  | Diameter, height, thickness (mm) | Diameter 300/height 300/thickness 12 | Diameter 300/height 300/thickness 12 |
|  | Light transmittance of colorless and transparent layer at 240 nm (%, 10-mm thickness) | 64 | 43 |
|  | OH Concentration (ppm by weight) | 12 | 2 |
|  | $H_2$ Concentration (molecules/cm$^3$) | $1 \times 10^{16}$ | $2 \times 10^{16}$ |
|  | Amount of $H_2O$ release (molecules/cm$^3$) | $6 \times 10^{16}$ | $<5 \times 10^{16}$ |
|  | Al Concentration (ppm by weight) | 20 | 20 |
|  | $\log(\eta/Pa \cdot s)$ of colorless and transparent layer at 1400° C. ($\eta$: viscosity(Pa·s)) | 10.6 | 10.7 |
| Physical properties of inner layer | Color tone | Colorless and transparent | Colorless and transparent |
|  | Thickness (mm) | 3 | 3 |
|  | OH Concentration (ppm by weight) | 15 | 20 |
|  | $H_2$ Concentration (molecules/cm$^3$) | $<5 \times 10^{15}$ | $<5 \times 10^{15}$ |
|  | Amount of $H_2O$ release (molecules/cm$^3$) | $<5 \times 10^{16}$ | $<5 \times 10^{16}$ |
| Evaluation | Silicon single crystal mutipulling | Fair | Good |
|  | Thermal distortion resistance | Fair | Good |
|  | Void and pinhole of silicon single crystal | Good | Good |

TABLE 3

| | Example No. | Example 5 | Example 6 |
|---|---|---|---|
| | Powdered substrate's raw material | Powdered natural silica Particle diameter: 50 to 500 μm | Powdered natural silica Particle diameter: 50 to 500 μm |
| | Powdered inner-layer's raw material | Powdered synthetic cristobalite Particle diameter: 100 to 300 μm | Powdered synthetic cristobalite Particle diameter: 100 to 300 μm |
| | Preliminary molding method of silica substrate | Rotation molding within graphite frame | Rotation molding within graphite frame |
| | Melting method of silica substrate | Arc discharge melting under aspiration | Arc discharge melting under aspiration |
| | Atmospheric gas during silica substrate melting | $N_2$: 40% by volume, $H_2$: 60% by volume | $N_2$: 20% by volume, $H_2$: 80% by volume |
| | Atmospheric gas during inner layer melting | $N_2$: 90% by volume, $H_2$: 10% by volume | $N_2$: 90% by volume, $H_2$: 10% by volume |
| | Atmospheric gas during cooling | $N_2$: 80% by volume, $O_2$: 20% by volume | $N_2$: 80% by volume, $O_2$: 20% by volume |
| Physical properties of silica substrate | Color tone | White opaque to colorless transparent | White opaque to colorless transparent |
| | Diameter, height, thickness (mm) | Diameter 300/height 300/thickness 12 | Diameter 300/height 300/thickness 12 |
| | Light transmittance of colorless and transparent layer at 240 nm (%, 10-mm thickness) | 25 | 10 |
| | OH Concentration (ppm by weight) | 1 | <1 |
| | $H_2$ Concentration (molecules/cm$^3$) | $3 \times 10^{16}$ | $4 \times 10^{16}$ |
| | Amount of $H_2O$ release (molecules/cm$^3$) | $<5 \times 10^{16}$ | $<5 \times 10^{16}$ |
| | Al Concentration (ppm by weight) | 30 | 30 |
| | $\log(\eta/Pa \cdot s)$ of colorless and transparent layer at 1400° C. ($\eta$: viscosity(Pa·s)) | 10.8 | 10.9 |
| Physical properties of inner layer | Color tone | Colorless and transparent | Colorless and transparent |
| | Thickness (mm) | 3 | 3 |
| | OH Concentration (ppm by weight) | 15 | 10 |
| | $H_2$ Concentration (molecules/cm$^3$) | $<5 \times 10^{15}$ | $<5 \times 10^{15}$ |
| | Amount of $H_2O$ release (molecules/cm$^3$) | $<5 \times 10^{16}$ | $<5 \times 10^{16}$ |
| Evaluation | Silicon single crystal mutipulling | Good | Good |
| | Thermal distortion resistance | Good | Good |
| | Void and pinhole of silicon single crystal | Good | Good |

TABLE 4

| Example No. | Example 7 | Example 8 |
|---|---|---|
| Powdered substrate's raw material | Powdered natural silica Particle diameter: 50 to 500 μm | Powdered natural silica Particle diameter: 50 to 500 μm |
| Powdered inner-layer's raw material | No | Powdered synthetic cristobalite Particle diameter: 100 to 300 μm |
| Preliminary molding method of silica substrate | Rotation molding within graphite frame | Rotation molding within graphite frame |
| Melting method of silica substrate | Arc discharge melting under aspiration | Arc discharge melting under aspiration |
| Atmospheric gas during silica substrate melting | $N_2$: 85% by volume, $H_2$: 15% by volume | $N_2$: 85% by volume, $H_2$: 15% by volume |
| Atmospheric gas during inner layer melting | — | $N_2$: 95% by volume, $H_2$: 5% by volume |
| Atmospheric gas during cooling | $N_2$: 60% by volume, $O_2$: 20% by volume | $H_2$: 80% by volume, $O_2$: 20% by volume |

TABLE 4-continued

| | Example No. | Example 7 | Example 8 |
|---|---|---|---|
| Physical properties of silica substrate | Color tone | White opaque to colorless transparent | White opaque to colorless transparent |
| | Diameter, height, thickness (mm) | Diameter 300/height 300/thickness 12 | Diameter 300/height 300/thickness 12 |
| | Light transmittance of colorless and transparent layer at 240 nm (%, 10-mm thickness) | 72 | 70 |
| | OH Concentration (ppm by weight) | 8 | 7 |
| | $H_2$ Concentration (molecules/cm$^3$) | $1 \times 10^{16}$ | $1 \times 10^{16}$ |
| | amount of $H_2O$ release (molecules/cm$^3$) | $1 \times 10^{17}$ | $1 \times 10^{17}$ |
| | Al Concentration (ppm by weight) | 2 | 20 |
| | $\log(\eta/Pa \cdot s)$ of colorless and transparent layer at 1400° C. ($\eta$: viscosity(Pa · s)) | 10.5 | 10.5 |
| Physical properties of inner layer | Color tone | — | Colorless and transparent |
| | Thickness (mm) | — | 3 |
| | OH Concentration (ppm by weight) | — | 20 |
| | $H_2$ Concentration (molecules/cm$^3$) | — | $<5 \times 10^{15}$ |
| | Amount of $H_2O$ release (molecules/cm$^3$) | — | $<5 \times 10^{16}$ |
| Evaluation | Silicon single crystal mutipulling | Fair | Fair |
| | Thermal distortion resistance | Fair | Fair |
| | Void and pinhole of silicon single crystal | Fair | Fair |

TABLE 5

| | Example No. | Comparative Example 1 | Comparative Example 2 |
|---|---|---|---|
| Powdered substrate's raw material | | Powdered natural silica Particle diameter: 100 to 300 μm | Powdered natural silica Particle diameter: 100 to 300 μm |
| Powdered inner-layer's raw material | | Powdered synthetic cristobalite Particle diameter: 100 to 300 μm | Powdered synthetic cristobalite Particle diameter: 100 to 300 μm |
| Preliminary molding method of silica substrate | | Rotation molding within graphite frame | Rotation molding within alumina frame |
| Melting method of silica substrate | | Arc discharge melting under normal pressure | Arc discharge melting under aspiration |
| Atmospheric gas during silica substrate melting | | air | air |
| Atmospheric gas during inner layer melting | | air | air |
| Atmospheric gas during cooling | | air | air |
| Physical properties of silica substrate | Color tone | White opaque (many gaseous bubbles) | White opaque to colorless transparent |
| | Diameter, height, thickness (mm) | Diameter 300/height 300/thickness 12 | Diameter 300/height 300/thickness 12 |
| | Light transmittance of colorless and transparent layer at 240 nm (%, 10-mm thickness) | not measurable | 91 |
| | OH Concentration (ppm by weight) | 130 | 100 |
| | $H_2$ Concentration (molecules/cm$^3$) | $<5 \times 10^{15}$ | $<5 \times 10^{15}$ |
| | Amount of $H_2O$ release (molecules/cm$^3$) | $3 \times 10^{17}$ | $2 \times 10^{17}$ |
| | Al Concentration (ppm by weight) | 2 | 2 |

TABLE 5-continued

| | Example No. | Comparative Example 1 | Comparative Example 2 |
|---|---|---|---|
| | $\log(\eta/Pa \cdot s)$ of colorless and transparent layer at 1400° C. ($\eta$: viscosity(Pa·s)) | 10.2 | 10.3 |
| Physical properties of inner layer | Color tone | Colorless and transparent | Colorless and transparent |
| | Thickness (mm) | 3 | 3 |
| | OH Concentration (ppm by weight) | 150 | 130 |
| | $H_2$ Concentration (molecules/cm$^3$) | $<5 \times 10^{15}$ | $<5 \times 10^{15}$ |
| | Amount of $H_2O$ release (molecules/cm$^3$) | $2 \times 10^{17}$ | $2 \times 10^{17}$ |
| Evaluation | Silicon single crystal mutipulling | Fair | Fair |
| | Thermal distortion resistance | Poor | Poor |
| | Void and pinhole of silicon single crystal | Poor | Poor |

TABLE 6

| | Example No. | Comparative Example 3 | Comparative Example 4 |
|---|---|---|---|
| Powdered substrate's raw material | | Powdered natural silica Particle diameter: 50 to 500 μm | Powdered natural silica Particle diameter: 50 to 500 μm |
| Powdered inner-layer's raw material | | No | Powdered synthetic cristobalite Particle diameter: 100 to 300 μm |
| Preliminary molding method of silica substrate | | Rotation molding within graphite frame | Rotation molding within graphite frame |
| Melting method of silica substrate | | Arc discharge melting under aspiration | Arc discharge melting under aspiration |
| Atmospheric gas during silica substrate melting | | $N_2$: 90% by volume, $H_2$: 10% by volume | $N_2$: 90% by volume, $H_2$: 10% by volume |
| atmospheric gas during inner layer melting | | — | $N_2$: 95% by volume, $H_2$: 5% by volume |
| Atmospheric gas during cooling | | $N_2$: 80% by volume, $O_2$: 20% by volume | $H_2$: 80% by volume, $O_2$: 20% by volume |
| Physical properties of silica substrate | Color tone | White opaque to colorless transparent | White opaque to colorless transparent |
| | Diameter, height, thickness (mm) | Diameter 300/height 300/thickness 12 | Diameter 300/height 300/thickness 12 |
| | Light transmittance of colorless and transparent layer at 240 nm (%, 10-mm thickness) | 82 | 83 |
| | OH Concentration (ppm by weight) | 20 | 25 |
| | $H_2$ Concentration (molecules/cm$^3$) | $5 \times 10^{15}$ | $5 \times 10^{15}$ |
| | Amount of $H_2O$ release (molecules/cm$^3$) | $8 \times 10^{16}$ | $8 \times 10^{16}$ |
| | Al Concentration (ppm by weight) | 2 | 20 |
| | $\log(\eta/Pa \cdot s)$ of colorless and transparent layer at 1400° C. ($\eta$: viscosity(Pa·s)) | 10.4 | 10.4 |
| Physical properties of inner layer | Color tone | — | Colorless and transparent |
| | Thickness (mm) | — | 3 |
| | OH Concentration (ppm by weight) | — | 20 |
| | $H_2$ Concentration (molecules/cm$^3$) | — | $<5 \times 10^{15}$ |
| | Amount of $H_2O$ release (molecules/cm$^3$) | — | $<5 \times 10^{16}$ |
| Evaluation | Silicon single crystal mutipulling | Fair | Fair |
| | Thermal distortion resistance | Poor | Poor |
| | Void and pinhole of silicon single crystal | Poor | Fair |

TABLE 7

(Unit: ppb by weight)

| Element | Example 3 | Example 4 | Example 5 | Example 6 | Example 8 | Comparative Example 1 | Comparative Example 2 | Comparative Example 4 |
|---|---|---|---|---|---|---|---|---|
| Li | 10 | 10 | 10 | 10 | 10 | 10 | 15 | 15 |
| Na | 50 | 50 | 50 | 50 | 50 | 50 | 60 | 60 |
| K  | 30 | 25 | 20 | 20 | 20 | 25 | 25 | 25 |
| Ti | 5  | 6  | 5  | 5  | 5  | 5  | 5  | 5  |
| V  | 2  | 3  | 2  | 2  | 3  | 2  | 3  | 3  |
| Cr | 10 | 10 | 10 | 10 | 10 | 10 | 10 | 10 |
| Fe | 25 | 20 | 20 | 20 | 25 | 25 | 25 | 25 |
| Co | 5  | 7  | 5  | 5  | 7  | 5  | 5  | 5  |
| Ni | 10 | 5  | 5  | 5  | 10 | 10 | 10 | 10 |
| Cu | 10 | 10 | 8  | 10 | 7  | 7  | 10 | 7  |
| Zn | 3  | 2  | 2  | 2  | 3  | 2  | 3  | 3  |
| Mo | 2  | 2  | 2  | 2  | 2  | 2  | 2  | 2  |
| W  | 1  | 3  | 1  | 1  | 2  | 2  | 2  | 2  |

As can be seen in Tables 1 to 7, in Examples 1 to 8 executed in accordance with the method for producing a silica container of the present invention, silica containers giving the results in pulling up of a single crystal no way inferior to the conventional silica container of Comparative Examples 1 could be obtained, even though silica containers produced in a low cost and a high productivity were used. In addition, the thermal distortion resistance could be improved remarkably as compared with the conventional silica container of Comparative Example 1.

As can be seen in Table 7, especially in Examples 3 to 6 and 8, in which the inner layer 56 was formed, amount of impure metal elements in the inner layer was in the same level as Comparative Example 1; and thus it can be seen that a single crystal with a sufficiently high purity can be pulled up.

In addition, in Examples 1 to 8, the amount of dissolved $H_2O$ molecule was extraordinary lower, giving fewer defects such as a void and a pinhole in the silicon single crystal produced by using the silica container thereof, as compared with Comparative Examples 1 and 2.

In Example 2, the ratio of an $H_2$ gas in the step of forming the substrate 51 from the preliminarily molded substrate 41 (Step 3) was made higher as compared with Example 1; as a result, the oxygen-deficient type defects could be formed more in the substrate and the released amount of an $H_2O$ gas could be reduced, as compared with Example 1. Because of this, formation of voids and pinholes could be reduced further.

In Examples 3 and 4, concentration of aluminum in the silica substrate 51 was made higher, and as a result, viscosity of the silica substrate 51 could be made higher, as compared with Examples 1 and 2. In Examples 3 and 4, though not shown in Tables, concentration of aluminum in the silica substrate 51 was made higher and the inner layer 56 was formed; as a result, a higher prevention effect of impurity diffusion as compared with Example 1 and Example 2 could be obtained.

In Example 5, the ratio of an $H_2$ gas in the step of forming the substrate 51 from the preliminarily molded substrate 41 (Step 3) was made higher as compared with Example 3, and as a result, amount of the oxygen-deficient type defects could be made further higher; and thus, viscosity at high temperature could be made high thereby making the silica container having a high thermal distortion resistance. This tendency was more eminent in Example 6.

From the results of Examples 7 and 8 and Comparative Examples 3 and 4, it can be seen that, in order to obtain an adequate thermal distortion resistance, the atmospheric gas at the time when the preliminarily molded silica substrate is melted in Step 3 needs to contain an $H_2$ gas with its ratio of higher than 10% by volume.

It must be noted here that the present invention is not limited to the embodiments as described above. The foregoing embodiments are mere examples; any form having substantially the same composition as the technical concept described in claims of the present invention and showing similar effects is included in the technical scope of the present invention.

The invention claimed is:

1. A method for producing a silica container comprised of at least a silica as its main component and arranged with a silica substrate having a rotational symmetry, wherein the method comprises:
    preparing a powdered substrate's raw material, comprised of silica particles, for forming the silica substrate;
    forming a preliminarily molded silica substrate, comprising feeding the powdered substrate's raw material to an inner wall of a carbon-made outer frame having a rotational symmetry and aspiration holes arranged splittingly in the inner wall while rotating the outer frame thereby preliminarily molding the powdered substrate's raw material to an intended shape in accordance with the inner wall of the outer frame;
    forming the silica substrate, comprising degassing the preliminarily molded silica substrate by aspiration from an outer peripheral side through the aspiration holes formed in the outer frame while charging from an inner peripheral side of the preliminarily molded silica substrate a reducing gas containing more than 10% by volume of an $H_2$ gas, and at the same time heating from inside the preliminarily molded silica substrate by a discharge-heat melting method with carbon electrodes, thereby making an outer peripheral part of the preliminarily molded silica substrate into a sintered body and an inner peripheral part of the preliminarily molded silica substrate into a fused glass body; and
    after forming the silica substrate, forming an inner layer comprised of a transparent silica glass on an inner surface of the silica substrate by spreading from inside the silica substrate a powdered inner layer's raw material comprised of crystalline silica and having a higher percentage of silica content by weight than the powdered substrate's raw material while heating from inside the silica substrate by a discharge-heat melting method.

2. The method for producing a silica container according to claim 1, wherein the powdered substrate's raw material contains aluminum in a concentration range of from 10 to 1000 ppm by weight.

3. The method for producing a silica container according to claim 1, wherein, in the powdered inner layer's raw material, each element concentration of Li, Na, and K is 60 or less ppb by weight, and each element concentration of Ti, V, Cr, Fe, Co, Ni, Cu, Zn, Mo, and W is 30 or less ppb by weight.

4. The method for producing a silica container according to claim 1, wherein forming the silica substrate further comprises cooling under an $O_2$ gas-containing oxidative gas atmosphere after heating by a discharge-heat melting method, wherein the ratio of an $O_2$ gas contained in the oxidative gas is in a range of from 1 to 30% by volume.

5. A silica container comprised of at least a silica as its main component and arranged with a silica substrate having a rotational symmetry, wherein the silica substrate contains oxygen-deficient type defects and has a white and opaque layer part containing gaseous bubbles in an outer peripheral part, and a colorless and transparent layer part comprised of a silica glass not substantially containing gaseous bubbles in an inner peripheral part; and an inner layer arranged on an inner surface of the silica substrate, the inner layer comprised of a transparent silica glass having a higher percentage of silica content by weight than the silica substrate.

6. The silica container according to claim 5, wherein a density of the oxygen-deficient type defects contained in the silica substrate in terms of the light transmittance at the wavelength of 240 nm in the colorless and transparent part is 80% or less per 10 mm of the light path length.

7. The silica container according to claim 5, wherein an amount of a released $H_2O$ molecule is $1 \times 10^{17}$ or less molecules/$cm^3$ when the colorless and transparent layer part of the silica substrate is heated at 1000° C. under vacuum.

8. The silica container according to claim 5, wherein a concentration of an $H_2$ molecule in the colorless and transparent part of the silica substrate is $5 \times 10^{16}$ or less molecules/$cm^3$.

9. The silica container according to claim 5, wherein a viscosity of the colorless and transparent layer part of the silica substrate at 1400° C. is $10^{10.5}$ Pa·s or higher.

10. The silica container according to claim 5, wherein a concentration of an OH group in the silica substrate is 60 or lower ppm by weight.

11. The silica container according to claim 5, wherein the silica substrate contains aluminum in the concentration range of from 10 to 1000 ppm by weight.

12. The silica container according to claim 5, wherein the inner layer contains an OH group with the concentration of 30 or less ppm by weight, an element of Li, Na, and K with each element having a concentration of 60 or less ppb by weight, and an element of Ti, V, Cr, Fe, Co, Ni, Cu, Zn, Mo, and W with each element having a concentration of 30 or less ppb by weight.

* * * * *